United States Patent
Raghavendra et al.

(10) Patent No.: US 10,846,339 B2
(45) Date of Patent: Nov. 24, 2020

(54) STRUCTURED SCHEMA FOR TEMPORAL GRAPH STORAGE AND RETRIEVAL

(71) Applicant: Cisco Technology, Inc., San Jose, CA (US)

(72) Inventors: Arun Kumar Raghavendra, Bangalore (IN); Bhalaji Narayanan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 358 days.

(21) Appl. No.: 15/828,316

(22) Filed: Nov. 30, 2017

(65) Prior Publication Data

US 2018/0365336 A1    Dec. 20, 2018

(30) Foreign Application Priority Data

Jun. 20, 2017  (IN) .............................. 201741021532
Jun. 20, 2017  (IN) .............................. 201741021533

(51) Int. Cl.
*G06F 7/00* (2006.01)
*G06F 16/901* (2019.01)
(Continued)

(52) U.S. Cl.
CPC ...... *G06F 16/9024* (2019.01); *G06F 16/2477* (2019.01); *G06F 16/907* (2019.01);
(Continued)

(58) Field of Classification Search
CPC ......... G06F 17/30958; G06F 17/30997; G06F 17/30551; G06F 16/9024; G06F 16/907;
(Continued)

(56) References Cited

U.S. PATENT DOCUMENTS 10,511,498 B1 * 12/2019 Narayan ............. H04L 61/1511
2005/0223092 A1   10/2005 Sapiro et al.
(Continued)

OTHER PUBLICATIONS

The International Searching Authority, "Search Report" in application No. PCT/US2018/038116, dated Oct. 2, 2018, 13 pages.
(Continued)

*Primary Examiner* — Mohammed R Uddin
(74) *Attorney, Agent, or Firm* — Merchant & Gould P.C.

(57) ABSTRACT

A method for performing network analysis comprising: receiving telemetry information for a computer network, the telemetry information comprising network device state information for internetworking devices in the computer network and network traffic flow information for data packet flows through the computer network; transforming the telemetry information into a temporal graph that is digitally stored in computer memory, wherein the temporal graph comprises a plurality of graph elements include a plurality of vertices and a plurality of edges, each of the vertices representing an internetworking device, each of the edges representing one or more portions of a data packet flow; digitally storing graph element metadata corresponding to the plurality of graph elements in a structured format, the graph element metadata comprising temporal data for each graph element of the plurality of graph elements, the temporal data comprising a modification time value specifying a modification time that is associated with each graph element.

20 Claims, 17 Drawing Sheets

(51) Int. Cl.
*H04Q 9/02* (2006.01)
*G06F 16/907* (2019.01)
*G06F 16/2458* (2019.01)
*H04L 12/26* (2006.01)
*G06T 11/20* (2006.01)
*H04L 12/24* (2006.01)
*H04Q 9/00* (2006.01)

(52) U.S. Cl.
CPC ........ *G06T 11/206* (2013.01); *H04L 41/0859* (2013.01); *H04L 41/14* (2013.01); *H04L 41/22* (2013.01); *H04L 43/04* (2013.01); *H04L 43/045* (2013.01); *H04L 43/06* (2013.01); *H04Q 9/02* (2013.01); *H04L 41/142* (2013.01); *H04L 43/08* (2013.01); *H04Q 9/00* (2013.01)

(58) Field of Classification Search
CPC ........ G06F 16/2477; H04Q 9/02; H04Q 9/00; G06T 11/206; H04L 43/045; H04L 43/04; H04L 41/0859; H04L 41/14; H04L 43/08; H04L 4/142; H04L 41/22
USPC ................................ 707/798, 649, 695, 794
See application file for complete search history.

(56) References Cited

U.S. PATENT DOCUMENTS

| | | | |
|---|---|---|---|
| 2011/0270853 A1* | 11/2011 | Curbera | G06F 16/9024 707/755 |
| 2013/0232433 A1 | 9/2013 | Krajec et al. | |
| 2014/0137240 A1* | 5/2014 | Smith | H04L 63/1441 726/22 |
| 2015/0295779 A1 | 10/2015 | Ching et al. | |
| 2015/0381515 A1* | 12/2015 | Mattson | H04L 41/145 707/609 |
| 2016/0063132 A1* | 3/2016 | Chen | G06F 16/9024 707/609 |
| 2016/0285692 A1* | 9/2016 | Finkler | H04L 41/12 |
| 2016/0299991 A1* | 10/2016 | Hong | G06F 16/9024 |
| 2016/0359872 A1* | 12/2016 | Yadav | H04L 43/04 |
| 2017/0026270 A1* | 1/2017 | Handige Shankar | H04L 41/22 |
| 2017/0193029 A1* | 7/2017 | Bennett | G06F 17/5004 |
| 2017/0279660 A1* | 9/2017 | Muntes-Mulero | G06F 16/288 |
| 2017/0366395 A1* | 12/2017 | Goldfarb | H04L 12/4633 |
| 2018/0048519 A1* | 2/2018 | Outhred | H04L 41/0677 |
| 2018/0210927 A1* | 7/2018 | Karam | G06F 16/248 |
| 2018/0234310 A1* | 8/2018 | Ingalls | H04L 43/12 |
| 2018/0329958 A1* | 11/2018 | Choudhury | G06F 16/24568 |
| 2018/0367414 A1 | 12/2018 | Raghavendra et al. | |
| 2019/0149396 A1* | 5/2019 | Zafer | H04L 41/0631 709/224 |

OTHER PUBLICATIONS

Current Claims in application No. PCT/US2018/038116, dated Oct. 2018, 7 pages.

* cited by examiner

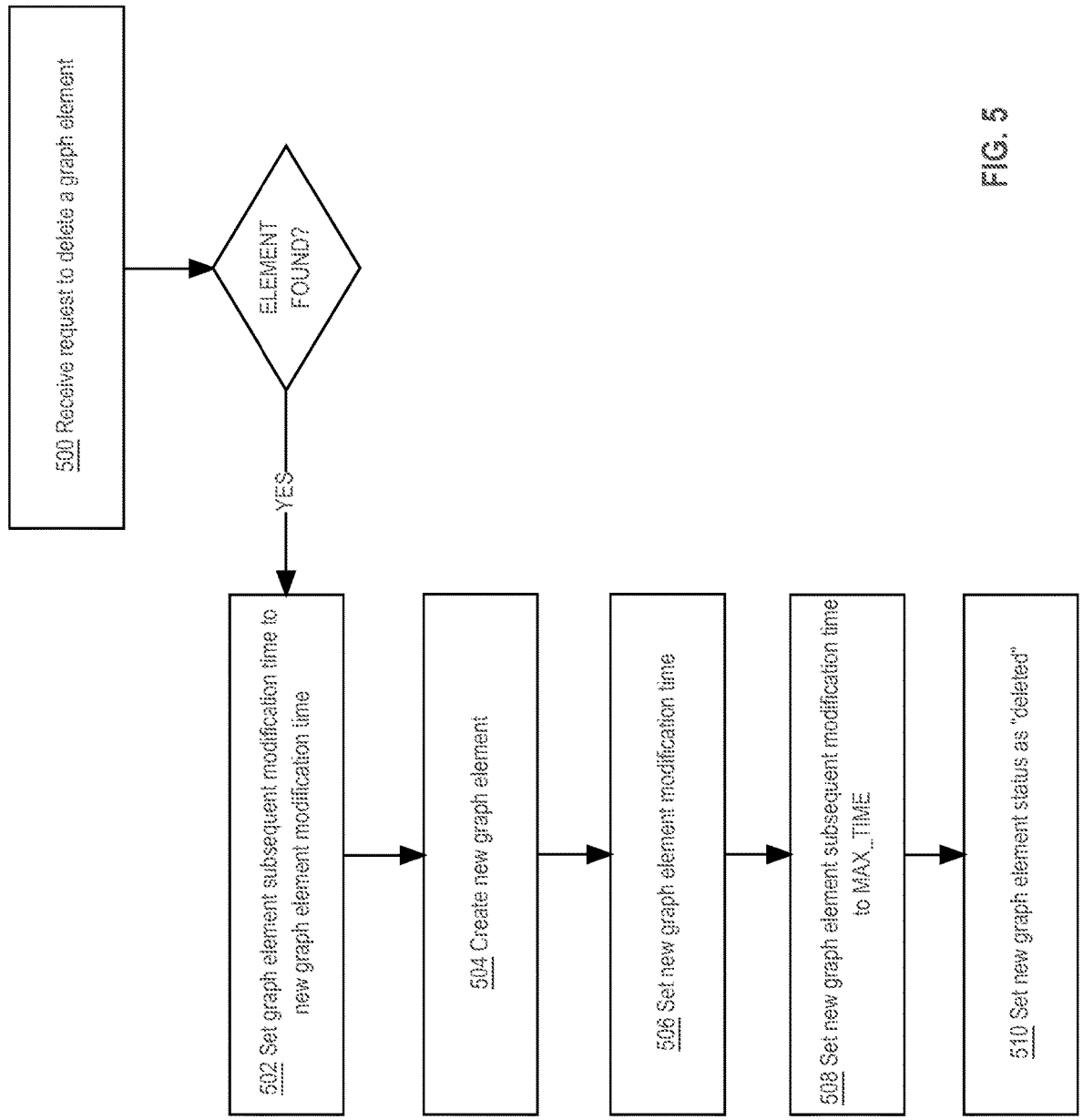

STRUCTURED SCHEMA FOR TEMPORAL GRAPH STORAGE AND RETRIEVAL

BENEFIT CLAIM

This application claims the benefit under 35 U.S.C. § 119 of India application 201741021533, filed Jun. 20, 2017, and India application 201741021532, filed Jun. 20, 2017, the entire contents of each of which are hereby incorporated by reference for all purposes as if fully set forth herein.

FIELD OF THE INVENTION

The present invention relates to computer networks, and more specifically, to using and storing temporal graphs to analyze network telemetry information.

BACKGROUND

Time-series analytics of network telemetry information is a field of active study. With expanding computer networks and increasing speed, volume, and types of data traffic on the computer networks, there is demand to collect, store, and analyze metrics information from the computer networks in order to identify trends related to network conditions and traffic patterns. The analysis can help network administrators improve operational efficiency of the networks and improve the user experience of users on the networks.

Computer networks are complex entities that comprise many interconnected devices with different traffic flows at any given point in time. A traffic flow represents data traffic that originates from a source, traverses a path along the network, and terminates at a destination. A traffic flow may also be bi-directional.

Network topology, device parameters, and link states continuously change throughout the network. With this data, various types of network analysis can be performed, such as determining devices that are getting over-used in a network in a given time period, links that go down too often during peak hours, paths that are used more than others during specific times of the year, optimized routes between any two points in the network, and so on. The set of active flows at a given time may be used to identify active users in a network or sets of resources that traffic is transiting through during the given time period.

Three different data retrieval abilities are used to perform these different types of analysis: retrieving a snapshot describing the state of a computer network at any given time, retrieving data from a particular period of time, and traversing data to identify and correlate conditions across both spatial and temporal domains. Additionally, to process a large amount of network telemetry information, it is necessary to store all the relevant data in an efficient manner.

However, previous data storage solutions are unable to address all three of data retrieval abilities simultaneously. For example, typical data storage solutions that enable snapshot retrieval are unable to provide time traversal functionalities. A typical snapshot storage and retrieval system stores snapshots in association with different points in time. To view data from a particular point in time, the snapshot associated with the particular point in time is retrieved. If modifications were made between two points in time but no snapshot was stored, then the modifications are not reflected in the snapshots. Furthermore, the snapshot storage and retrieval system does not allow retrieving data across a period of time, or correlating data from different points in time. Thus, techniques for efficient storage of telemetry information that provide greater data retrieval and processing capabilities are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The appended claims may serve as a summary of the invention.

BRIEF DESCRIPTION OF THE DRAWINGS

In the drawings:

FIG. 5 is a flowchart of an example process for deleting a graph element, according to various embodiments.

DETAILED DESCRIPTION

Figure 1:
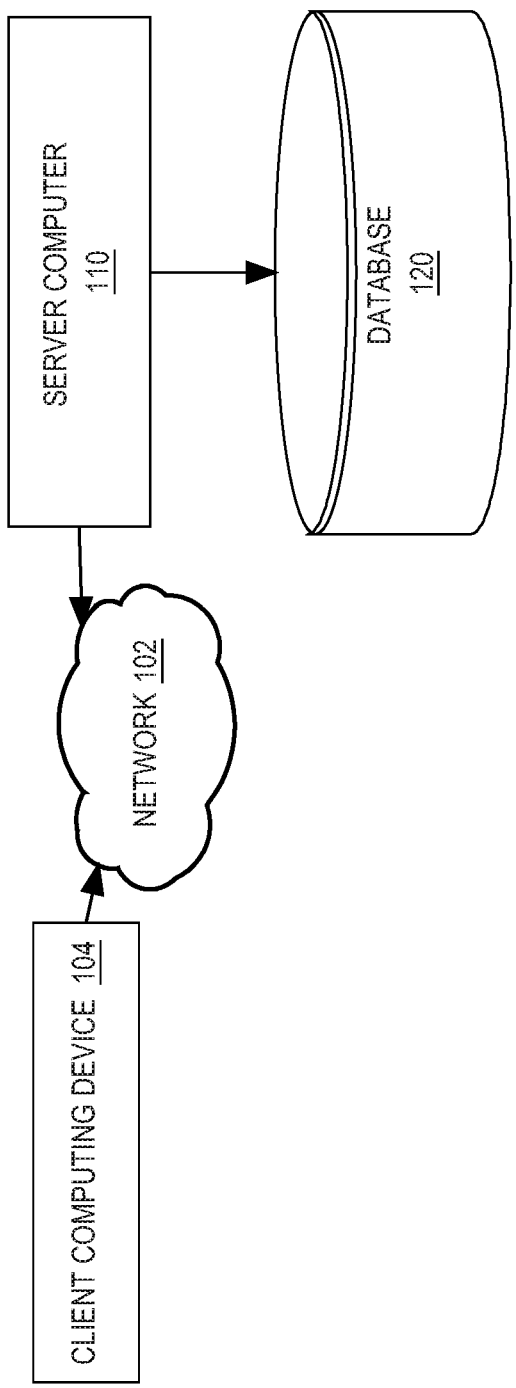
FIG. 1 is a diagram of a networked environment in which the techniques described herein may be implemented, according to various embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1.0 GENERAL OVERVIEW
2.0 SYSTEM OVERVIEW
3.0 NETWORK TELEMETRY INFORMATION
4.0 TEMPORAL GRAPH OVERVIEW
   4.1 GRAPH STORAGE
   4.2 GRAPH TRAVERSAL LANGUAGE
   4.3 GRAPH ELEMENT CREATION
   4.4 GRAPH ELEMENT MODIFICATION
   4.5 GRAPH ELEMENT DELETION
5.0 TEMPORAL GRAPH OPERATIONS
   5.1 TEMPORAL TRAVERSAL
   5.2 SNAPSHOT RETRIEVAL AND TRAVERSAL
   5.3 HISTORICAL DATA RETRIEVAL
6.0 NETWORK ANALYSIS USING TEMPORAL GRAPHS
7.0 IMPLEMENTATION EXAMPLE—HARDWARE OVERVIEW

1.0 General Overview

Computer-implemented techniques are provided for analyzing network telemetry information using temporal graphs. A temporal graph may be traversed and/or graph elements may be retrieved to generate network analytics information.

In an embodiment, network telemetry information is received. The telemetry information comprises network device state information for internetworking devices in the network and network traffic flow information for data packet flows through the network. The telemetry information is transformed into a temporal graph that is digitally stored in computer memory.

In an embodiment, the temporal graph comprises a plurality of graph elements including a plurality of vertices and a plurality of edges. Each vertex may represent an internetworking device, and each edge may represent a data packet flow, or a portion thereof, through the network. Additionally, graph element metadata corresponding to the plurality of graph elements may be stored in a structured format. The graph element metadata may comprise temporal data for each graph element, the temporal data comprising a modification time value specifying a modification time that is associated with each graph element. Additionally or alternatively, the temporal data comprises a subsequent modification time value specifying the modification time associated with a subsequent version of each graph element.

In an embodiment, in response to receiving a request for network analytics information, network analytics information is generated based on the temporal graph. In an embodiment, generating network analytics information comprises generating a snapshot of the temporal graph. Additionally or alternatively, generating network analytics information comprises retrieving historical data for one or more graph elements in the temporal graph, wherein the historical data corresponds to a particular time period. Additionally or alternatively, generating network analytics information comprises temporally traversing the temporal graph.

2.0 System Overview

FIG. 1 illustrates an example computer system in which the techniques described may be practiced, according to one embodiment.

In an embodiment, a computer system 100 comprises a plurality of components that may be implemented at least partially by hardware at one or more computing devices, such as one or more hardware processors executing stored program instructions stored in one or more memories for performing the functions that are described herein. In other words, in an embodiment, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a client computing device 104 that is coupled via a network connection 102 to a server computer 110, which is coupled to a database 120.

In one embodiment, client computing device 104 is any computing device, such as a laptop, hand-held computer, wearable computer, cellular or mobile phone, portable digital assistant (PDA), or tablet computer. Although a single computing device is depicted in FIG. 1, any number of mobile computing devices may be present. Each client computing device 104 is communicatively connected to server computer 110 through network 102 which comprises any combination of a LAN, a WAN, one or more internetworks such as the public Internet, a cellular network, or a company network.

Client computing device 104 also includes other hardware elements, such as one or more input devices, memory, processors, and the like, which are not depicted in FIG. 1. Client computing device 104 also includes applications, software, and other executable instructions to facilitate various aspects of embodiments described herein. These applications, software, and other executable instructions may be installed by a user, owner, manufacturer, or other entity related to the client computing device 104.

In an embodiment, client computing device 104 includes a client application 106 that displays a network analytics application and/or database console for interacting with server computer 110. In an embodiment, the client application 106 may implement functional calls, callbacks, methods, or other programmatic means for contacting the server computer to obtain temporal graph data, network analytics information, and other data that can form the basis for analyzing network telemetry information.

Server computer 110 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 110 broadly represents one or multiple server computers, such as a server cluster, and the server computer may be located in one or more physical locations. Server computer 110 also may represent one or more virtual computing instances that execute using one or more computers in a datacenter such as a virtual server farm.

Server computer 110 is communicatively connected to database 120 and client computing device 104 through any kind of computer network using any combination of wired and wireless communication, including, but not limited to: a Local Area Network (LAN), a Wide Area Network (WAN), one or more internetworks such as the public Internet, or a company network. Server computer 110 may host or execute a network analytics application. Additionally or alternatively, server computer 110 may be a database server that manages database 120. Additionally, server computer 110 may include other applications, software, and other executable instructions, such as a database interface, to facilitate various aspects of embodiments described herein.

In one embodiment, the database interface is a programmatic interface such as JDBC OR ODBC for communicating with database 120. The database interface may communicate with any number of databases and any type of database, in any format.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database may include one or nodes located at a data warehouse(s). Additionally, in one embodiment, database 120 may be located on the same device(s) as server computer 110. Alternatively, database 120 may be located on a separate device(s) from server computer 110.

Database 120 may be in any format, such as a relational database, a noSQL database, or any other format. Database 120 is communicatively connected with server computer 110 through any kind of computer network using any combination of wired and wireless communication of the type previously described. Optionally, database 120 may be communicatively connected with other components, either directly or indirectly, such as one or more third party data suppliers. Generally, database 120 stores data related to network analytics including, but not limited to, network telemetry information and temporal graph data.

3.0 Network Telemetry Information

Computer networks comprise many interconnected devices with different traffic flows at different points in time. At various points in time, devices and connections between devices may be added, modified or removed. Network telemetry information for a computer network describes the state of the computer network at these various points in time.

In an embodiment, network telemetry information comprises network device state information. Device state information describes internetworking devices within the computer network. An internetworking device may be any device connected to the computer network, such as user computing device, a server computer, network router, network switch, and etc. Additionally or alternatively, device state information may describe users, services, applications, network interfaces, network resources, and other non-hardware entities related to the internetworking devices.

Additionally or alternatively, network telemetry information may comprise network traffic flow information. Network traffic flow information describes data packet flows through the computer network. As referred to herein, a 'flow' represents network traffic that originates from a source, such as a user computing device, traverses a path within the computer network, and terminates at a destination, such as a server computer. A flow may be uni-directional or bi-directional.

In an embodiment, device state information is generated based on network traffic flow information. Network traffic flow information may indicate the internetworking devices traversed by the flow. For example, if a flow is from a user device to a server computer, then the user device and server computer were part of the computer network at the time of the flow.

Each of the network device state information and/or network traffic flow information may be associated with a particular time. In an embodiment, the time indicates when the associated information was acquired, received, generated, or stored. Additionally or alternatively, the time indicates when a device or traffic flow was created, modified, or removed.

4.0 Temporal Graph Overview

A temporal graph is a graph that is capable of storing time information in association with each vertex and/or each edge in the graph. Like non-temporal graphs, a temporal graph comprises a plurality of vertices and a plurality of edges. Graph edges and graph vertices are referred to herein as graph elements. The temporal graph may be used to store the information contained in a non-temporal graph. Additionally, each graph element is associated with time information indicating a time at which the graph element was created, modified, or removed.

In an embodiment, the temporal graph stores one or more versions of the same graph element. When a graph element is modified or removed, the previous version of the graph element remains. A subsequent version of the graph element is created that reflects the modification or deletion. The subsequent version is associated with time information indicating when the subsequent version was created. In other words, each version of a graph element corresponds to the state of the graph element at a particular point in time.

A temporal graph may be traversed similarly to a non-temporal graph. In an embodiment, the temporal graph may also be traversed temporally. Each version of a graph element is temporally linked to a subsequent version of the graph element, if a subsequent version exists. Similarly, if a previous version of the graph element exists, the graph element is temporally linked to the previous version. From a particular version of a graph element, the temporal links may be traversed to retrieve previous or subsequent version of the graph element.

In an embodiment, temporal links are stored as metadata in the temporal graph.

Metadata corresponding to a particular version of a graph element may indicate the subsequent and/or previous version of the graph element. Temporally traversing the temporal graph comprises retrieving the metadata corresponding to a graph element and using the metadata to identify the previous and/or subsequent version of the graph element. Additionally or alternatively, the temporal link comprises a temporal edge. A temporal edge is an edge of the temporal graph that indicates a temporal, rather than a spatial, connection between graph elements. Temporally traversing the temporal graph comprises traversing temporal edges.

Figure 2:
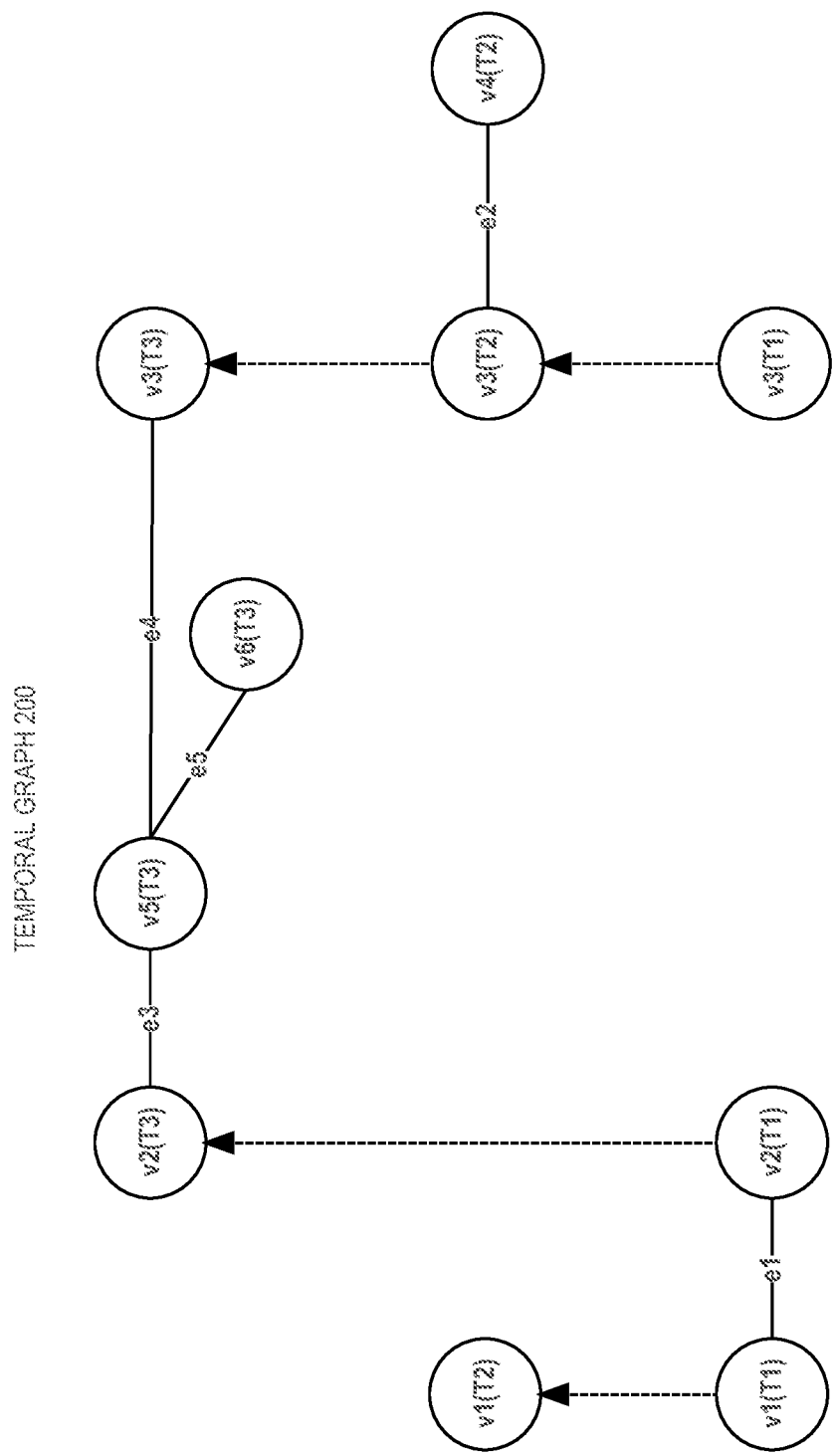
FIG. 2 is a diagram of an example temporal graph, according to various embodiments.

FIG. 2 illustrates a visual representation of an example temporal graph 200. Temporal graph 200 comprises vertices v1, v2, v3, v4, v5, and v6, and edges e1, e2, e3, e4, and e5. Temporal graph 200 comprises one or more versions of each graph element. Each version of a graph element is associated with one of time T1, time T2, or time T3.

In the illustrated example, at time T1, the temporal graph 200 includes a first version of vertices v1, v2, and v3. In addition, vertices v1 and v2 are connected by an edge e1.

At time T2, the temporal graph 200 includes a second version of vertex v1. As illustrated in FIG. 2, the second version of vertex v1 is associated with time T2. The second version of vertex v1 is temporally connected with the first version of vertex v1, as denoted by the dotted line. Vertex v2 and edge e1 did not change at time T2, so the second version of vertex v1 remains connected to the first version of vertex v2 by the first version of edge e1. Additionally, the temporal graph 200 includes a second version of vertex v3 that is associated with time T2. Temporal graph 200 also includes two additional vertices, v3 and v4, and an additional edge, v2, at time T2.

In an embodiment, data retrieval and graph traversal at any point in time is based on the graph data associated with that point in time. For example, referring to FIG. 2, time T1 is associated with only vertices v1, v2, and v3 and edge e1. Thus, if a request is for graph data at time t1, only those graph elements would be available. Similarly, a request for vertex v1 at time T1 would return the version of vertex v1 associated with time T1, rather than the version associated with time T2.

In an embodiment, in order to process and analyze network telemetry information, the network telemetry information for a computer network may be transformed into a temporal graph. A computing device such as server computer 105 or client computing device 145 may receive network telemetry information, analyzes the network telemetry information to identify network devices and network flows, and generates a temporal graph based on the network telemetry information. Each vertex of the temporal graph corresponds to a network device. Each edge of the temporal graph corresponds to a flow, or one or more portions of the flow, between two network devices. A change to a network device corresponds to a subsequent version of the corresponding vertex. Similarly, a change to a flow corresponds to a subsequent version of the corresponding edge.

Additionally or alternatively, each vertex may correspond to other network device state information described above. Each edge may represent relationships between the network device state information. For example, a first set of edges may indicate which users are connected to which network devices, and a second set of edges may associate network devices with site locations.

In an embodiment, the computing device retrieves or requests a plurality of stored network telemetry information. In other embodiments, the computing device receives network telemetry information in real-time or in intervals as the network telemetry information is generated and/or stored. Additionally or alternatively, a user may provide or upload the network telemetry information. In other embodiments, the computing device may receive commands or other input for creating, modifying, or removing graph elements based on network telemetry data. For example, an application may process network telemetry data and generate temporal graph commands to create graph elements based on the network telemetry data. The generated commands, when executed, create the specified graph elements.

In an embodiment, based on the type of network analytics to be performed using the temporal graph, or the type of information to be derived, different portions of network telemetry information may be converted into temporal graph data. For example, if bandwidth consumption is being analyzed, then the network telemetry information that describes bandwidth usage may be transformed into temporal graph data, while network telemetry information that is not related to bandwidth consumption is not included in the temporal graph.

4.1 Graph Storage

Temporal graph data may be stored in a structured format, such as in RDBMS tables, NoSQL tables, JSON, XML, or any other structured data format. In an embodiment, the temporal graph data is persistently stored in a database, such as database 120. In other embodiments, the temporal graph data may be stored in data files on one or more storage devices. Additionally or alternatively, the graph element metadata may be temporarily stored in memory of a computing device. For example, server computer 105 may receive network telemetry information and process the telemetry information to generate a temporal graph. Server computer 105 may store graph element metadata for the generated temporal graph in its computer memory.

In an embodiment, the temporal graph data comprises metadata corresponding to the graph elements of the temporal graph. The graph element metadata may comprise vertex metadata corresponding to each vertex of the plurality of vertices in the temporal graph and edge metadata corresponding to each edge of the plurality of edges.

In an embodiment, vertex metadata comprises a vertex identifier, a vertex label, a status identifier, and one or more vertex properties. The vertex identifier is a unique graph element identifier used to identify and/or locate a particular graph element. The vertex label is a user-specified label for the vertex. The status identifier indicates whether the vertex has been created or deleted. If the vertex was modified, rather than created or deleted, the status identifier may be blank or may not be included in the vertex metadata. The vertex properties are user-specified key-value pairs. For example, a vertex corresponding to a user may include properties such as user name, user address, and other user information.

In an embodiment, edge metadata comprises an edge identifier, an outbound vertex identifier, an inbound vertex identifier, an edge label, a status identifier, and one or more edge properties. The edge identifier is a unique graph element identifier used to identify and/or locate a particular graph element. The edge label is a user-specified label for the edge. The status identifier indicates whether the edge has been created or deleted. If the edge was modified, rather than created or deleted, the status identifier may be blank or may not be included in the edge metadata. The outbound vertex identifier indicates an out vertex on which the edge is incident. The inbound vertex identifier indicates an in vertex on which the edge is incident. The edge properties are user-specified key-value pairs. For example, an edge corresponding to a network packet flow may indicate the speed of the network connection, the amount of packet loss, and other connection information.

In an embodiment, the graph element metadata for a graph element comprises temporal data. The temporal data comprises a modification time value specifying a modification time associated with the graph element. The modification time may indicate when the particular version of the graph element was created, modified, or deleted. Additionally, the temporal data may comprise a subsequent modification time value specifying a modification time associated with the subsequent version of the graph element. For example, referring to FIG. 2, the modification time value for vertex 1 at time T1 would be "T1," while the subsequent modification time value would be "T2." The modification time values and the subsequent modification time values are used in snapshot retrieval, temporal graph traversal, and graph history retrieval.

Example vertex metadata in JSON format may be:
"~elementid": "1",
"~label": "vertex v1",
"~entrystatus": "created",
"~modificationtime": 142755604000,
"~subsequentmodifiationtime": 1473755606000,
"name": "user1",
"p1": 1,
"p2": 2

Example edge metadata in JSON format may be:
"~elementid": "101_knows_102",
"~label: "knows",
"~modificationtime": 1485933147536,
"~invertexid": "102",
"~outvertexid": "101",
"~entrystatus": "created",
"UserGroupProp1": "m33HpCouUkDv18TIWZR4"
"UserGroupProp2": true,
"Weight": 0.5

In the above example, the edge metadata does not include a subsequent modification time value, indicating that the edge is the current version. In other embodiments, the subsequent modification time value may be a value indicating that there is no subsequent version. For example, a subsequent modification time value of 0, "NaN," or infinity may be used to indicate that no subsequent version exists.

4.2 Graph Traversal Language

In an embodiment, a graph traversal language is used to perform graph operations such as data retrieval or graph traversal. For the purpose of providing a clear explanation, example commands are provided herein using a Gremlin language syntax. Just like Structured Query Language (SQL) is popular for use with relational database, Gremlin is a language that is used in graph databases. In an embodiment, all the features of the time series graph that are explored are presented in a syntax similar to Gremlin language and can be implemented as Gremlin extensions. In other embodiments, other graph traversal commands and languages may be used. The graph traversal commands may be received from a user through a client application, such as client application 196, a database command console, or any other text or graphical user interface. Additionally or alternatively, graph traversal commands may be provided as part of a script, application, or program.

In an embodiment, commands are executed to obtain a graph object and/or a graph traversal object. The graph object is used to retrieve stored graph data. The graph traversal object is used to perform graph traversal operations, graph element creation, graph element deletion, and otherwise interact with the graph database. Example commands for obtaining a graph object and a graph traversal object may be:

Graph graph=TimeSeriesGraph.open(Config_Input);
GraphTraversalSource g=graph.traversal( )

Commands may be used to create, modify, and/or delete a graph element. Additionally, an overwrite command may be used to overwrite all graph element properties. The commands may be used either with or without a timestamp value specified. In an embodiment, if a timestamp is not specified, the timestamp value of the current time is used as the modification timestamp value for the command.

4.3 Graph Element Creation

Figure 3:
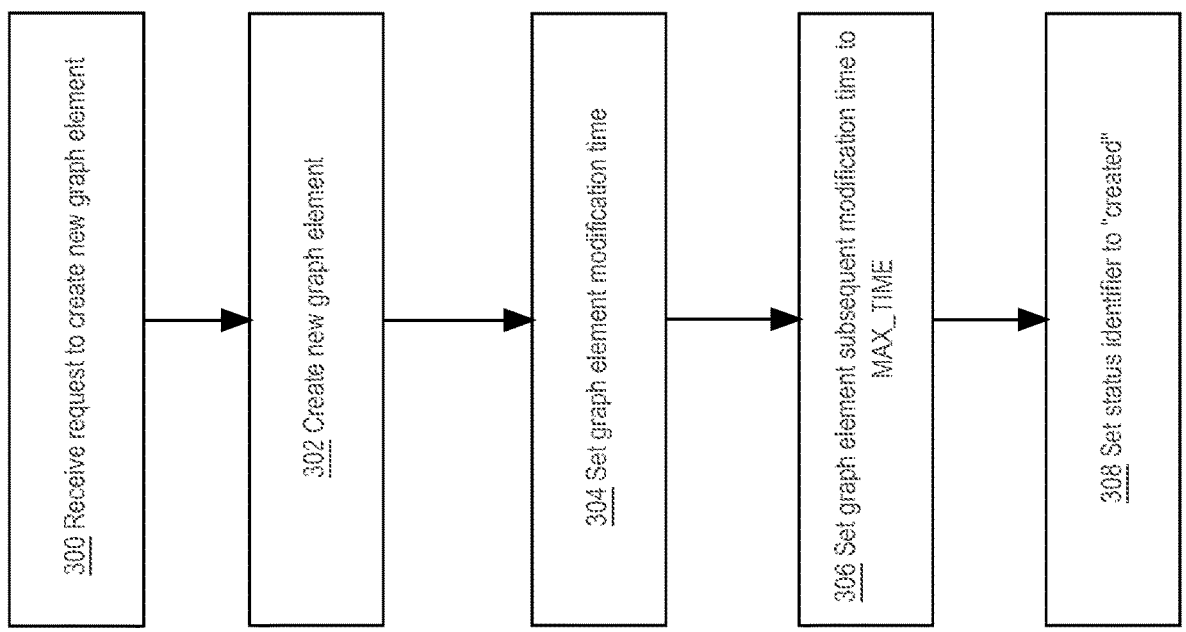
FIG. 3 is a flowchart of an example process for creating a graph element, according to various embodiments.

FIG. 3 illustrates example steps for creating a graph element. At step 300, a request to create a new graph element is received. The request may be, for example, from user input received at a client application, database console, and etc. Additionally or alternatively, graph element creation may be performed in response to receiving network telemetry information indicating a network device or network flow was added to the network. For example, server computer 110 may receive network telemetry information and determine that the network telemetry information includes information for a network device that does not correspond to any existing graph elements. Server computer 110 may create a new graph element corresponding to the network device. An example command for creating a new graph element may be:

g.addVertex(2016-08-13T08:33:24, T.id, 103, T.label, "software", "name", "lop103")

In step 302, a new graph element is created. If an element identifier is specified in the request, the new graph element is created with the specified element identifier. Alternatively, an element identifier is automatically generated for the new graph element. In an embodiment, creating a new graph element comprises generating graph element metadata corresponding to the new graph element. The graph element metadata may be stored in persistent storage, such as database 120.

In step 304, a modification time value is associated with the new graph element. If the request included a time value, then the specified time value is used as the modification time value. If the request did not include a time value, the time value of the current time may be used as the modification time value.

In step 306, a subsequent modification time value is set to a time value indicating that no subsequent version of the graph element exists. For example, the subsequent modification time value may be set to infinity or a "maximum time" value. Alternately, a subsequent modification time value is not associated with the new graph element. A graph element may not be associated with a subsequent modification time to indicate that no subsequent version of the graph element exists.

In step 308, the status identifier is set to indicate that the new graph element was created.

In an embodiment, after the new graph element is created, the graph element metadata may be stored in computer memory or to persistent storage.

4.4 Graph Element Modification

Figure 4:
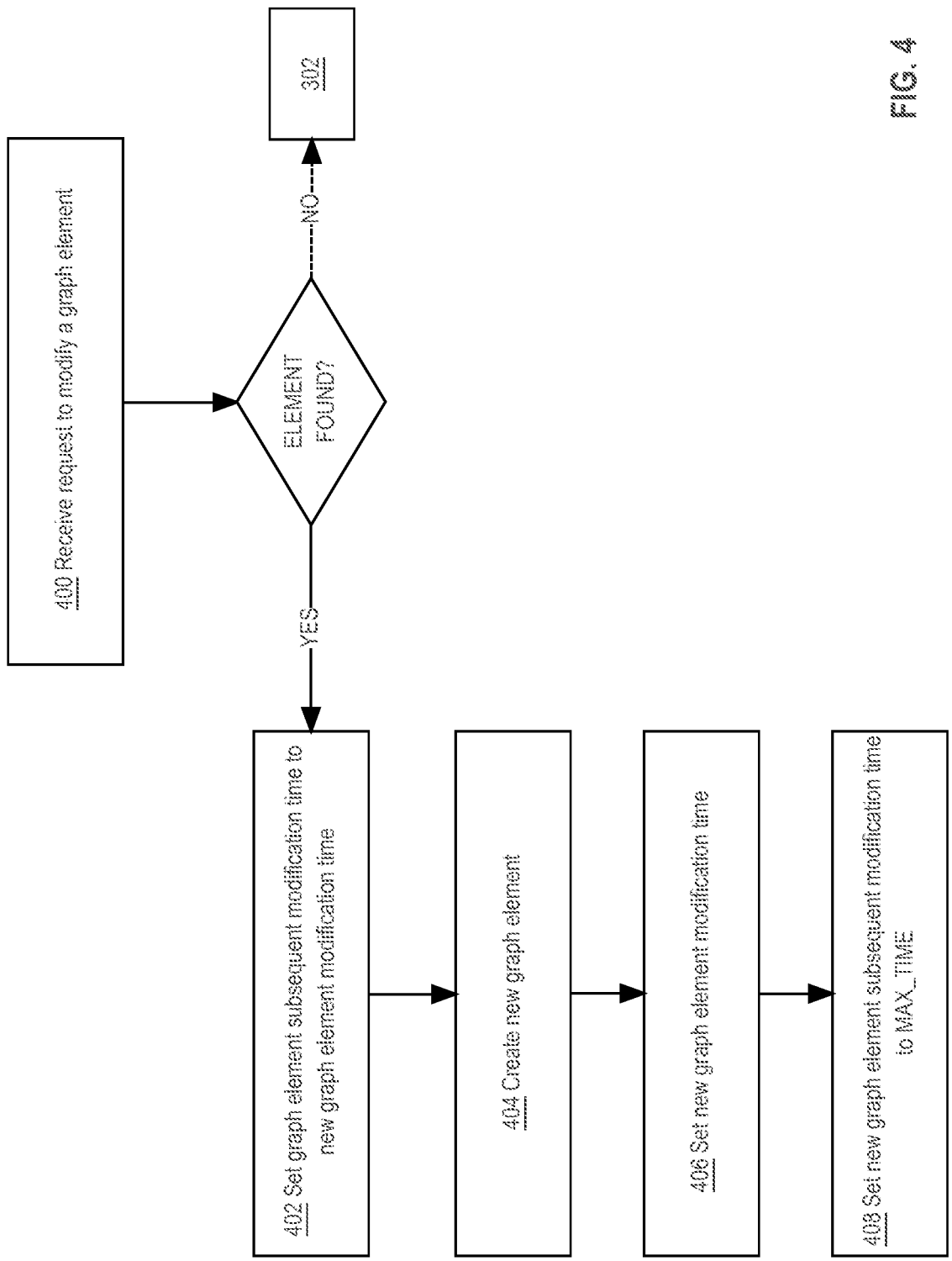
FIG. 4 is a flowchart of an example process for modifying a graph element, according to various embodiments.

FIG. 4 illustrates example steps for modifying a graph element. At step 400, a request to modify an existing graph element is received. The request may be, for example, from user input received at a client application, database console, and etc. Additionally or alternatively, graph element modification may be performed in response to receiving network telemetry information indicating a network device or network flow was added to the network. For example, server computer 110 may receive network telemetry information and determine that the network telemetry information includes modified or updated information for a network device that corresponds to an existing graph element. Server computer 110 may modify the existing graph element based on the modified or updated information. An example command for modifying an existing graph element may be:

vRef.property(2016-08-13T08:33:46, "location", "san diego", "startTime", 1997)

In an embodiment, the request includes an element identifier of the graph element being modified. If a graph element with the specified element identifier does not exist, then a new graph element is created, as described above, using the specified element identifier for the new graph element. In other embodiments, the system may generate a notification or error message indicating that a graph element with the specified element identifier was not found.

If a graph element with the specified element identifier is found, at step 402, the subsequent modification time value for the graph element is updated. Alternately, if the graph element is not associated with a subsequent modification time value, then the graph element is associated with a subsequent modification time value. If the request included a time value, then the specified time value is used as the subsequent modification time value. If the request did not include a time value, the time value of the current time may be used as the subsequent modification time value.

At step 404, a new graph element is created with the same graph element identifier. In an embodiment, creating the new graph element comprises generating graph element metadata for the new graph element. The graph element metadata for the new graph element is based on the graph element metadata for the previous version of the graph element. The graph element metadata may be copied from the previous version of the graph element, and updated to reflect the modifications indicated in the graph element modification request.

In step 406, a modification time value is associated with the new graph element. If the request included a time value, then the specified time value is used as the modification time value for the new graph element. If the request did not include a time value, the time value of the current time may be used as the modification time value.

In step 408, a subsequent modification time value is set to a time value indicating that no subsequent version of the graph element exists. For example, the subsequent modification time value may be set to infinity or a "maximum time" value. Alternately, a subsequent modification time value is not associated with the new graph element. A graph element may not be associated with a subsequent modification time to indicate that no subsequent version of the graph element exists.

In an embodiment, the status identifier indicates element creation or element deletion, and no status identifier is set for element modification. In other embodiments, the status identifier is set to indicate that the graph element was modified.

In an embodiment, rather than modifying one or more properties of a graph element, an overwrite command is used to overwrite all properties of the graph element. An overwrite is performed similarly to a modification as described above, but overwritten property values are specified for every graph element property.

4.5 Graph Element Deletion

FIG. 5 illustrates example steps for deleting a graph element. In the illustrated embodiment, when a graph element is deleted, a "tombstone entry" is created for the deleted graph element. As referred to herein, a tombstone entry refers to temporal graph data associated with a deleted graph element.

At step 500, a request to delete an existing graph element is received. The request may be, for example, from user input received at a client application, database console, and etc. Additionally or alternatively, graph element deletion may be performed in response to receiving network telemetry information indicating a network device or network flow was added to the network. For example, server computer 110 may receive network telemetry information and determine that the network telemetry information indicating that a data packet flow between two network devices no longer exists. Server computer 110 may delete the graph element corresponding to the data packet flow. An example command for deleting a graph element may be:

g.removeVertex(T.id, 103)

In an embodiment, the request includes an element identifier of the graph element being removed or deleted. If a graph element with the specified element identifier does not exist, then the deletion is not performed. Additionally, the system may generate a notification or error message indicating that a graph element with the specified element identifier was not found.

If a graph element with the specified element identifier is found, then at step 502, the subsequent modification time value for the graph element is updated. Alternately, if the graph element is not associated with a subsequent modification time value, then the graph element is associated with a subsequent modification time value. If the request included a time value, then the specified time value is used as the subsequent modification time value. If the request did not include a time value, the time value of the current time may be used as the subsequent modification time value.

At step 504, a new graph element is created with the same graph element identifier. In an embodiment, the new graph element does not include additional graph element property values, such as edge properties or vertex properties. Additionally, the new graph element may not include a subsequent modification time value. The status identifier of the new graph element is set to indicate that the graph element is deleted.

At step 506, a modification time value is associated with the new graph element. If the request included a time value, then the specified time value is used as the modification time value for the new graph element. If the request did not include a time value, the time value of the current time may be used as the modification time value.

At step 508, a subsequent modification time value is set to a time value indicating that no subsequent version of the graph element exists. For example, the subsequent modification time value may be set to infinity or a "maximum time" value. Alternately, a subsequent modification time value is not associated with the new graph element. A graph element may not be associated with a subsequent modification time to indicate that no subsequent version of the graph element exists.

In step 510, the status identifier is set to indicate that the new graph element is a deleted element.

5.0 Temporal Graph Operations

Once a temporal graph has been created, graph operations are used to traverse the temporal graph and to retrieve temporal graph data. The temporal graph may be spatially traversed similar to a non-temporal graph. From an edge, the vertices to which the edge is connected may be identified. Similarly, from a vertex, edges connected to the vertex may be identified.

Additionally, graph elements satisfying particular criteria or conditions may be identified and retrieved. For example, using an element identifier, graph elements that include the element identifier may be retrieved.

Temporal graph operations may also be used to traverse and/or retrieve temporal graph data. As explained in further detail below, the temporal graph operations include temporal traversal, snapshot retrieval and snapshot traversal, and historical data retrieval. In an embodiment, the temporal graph operations retrieve temporal graph data, such as temporal graph metadata. Additionally or alternatively, the temporal graph operations may return graph element data objects from which additional temporal graph operations may be performed.

5.1 Temporal Traversal

Temporal traversal comprises traversing temporal links, or edges, in a temporal graph. Temporal traversal is used to retrieve one or more versions of a graph element. Temporal traversal operations for a graph element include, for example, retrieving the previous version, the subsequent version, the first version, the last version, rewinding by a particular amount of time, or forwarding by a particular amount of time.

In an embodiment, the request comprises a graph traversal command. In other embodiments, the request may be other types of user input, automatically generated requests, or any other form for receiving a command.

In some embodiments, retrieving temporal graph data for graph elements that satisfy the request comprises translating the request into one or more data retrieval commands or operations.

FIG. 6A-D illustrate example steps for temporal traversal of a temporal graph. In the illustrated examples, a client, such as client computing device 104, sends a request to a server, such as server computer 110. The server computer processes the request, retrieves temporal graph data for graph elements that satisfy the request, and sends the temporal graph data to the client. In the illustrated embodiment, the server computer translates the request into database commands to retrieve temporal graph data satisfying the request from a database.

Figure 6A:
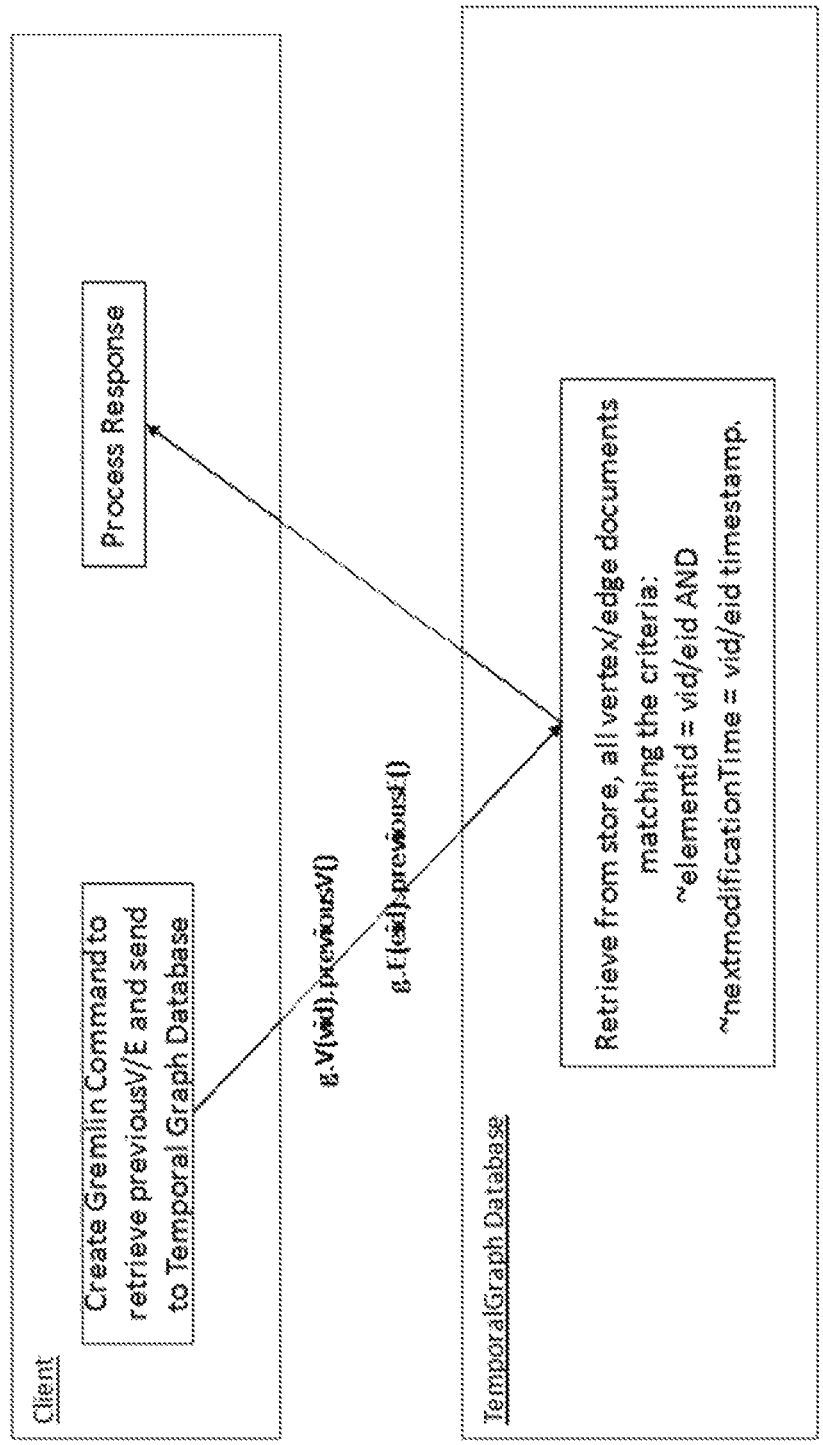
FIGS. 6A-6D are flowcharts of example processes for temporal traversal, according to various embodiments.

FIG. 6A illustrates example steps for retrieving the previous version of a vertex. In FIG. 6A, the client sends a "previous" command to the server. The command specifies a source vertex with a vertex identifier of "vid." The server processes the command and retrieves all vertices that have vertex identifier "vid," and whose subsequent modification time value is the same as the modification time value of the source vertex.

Figure 6B:
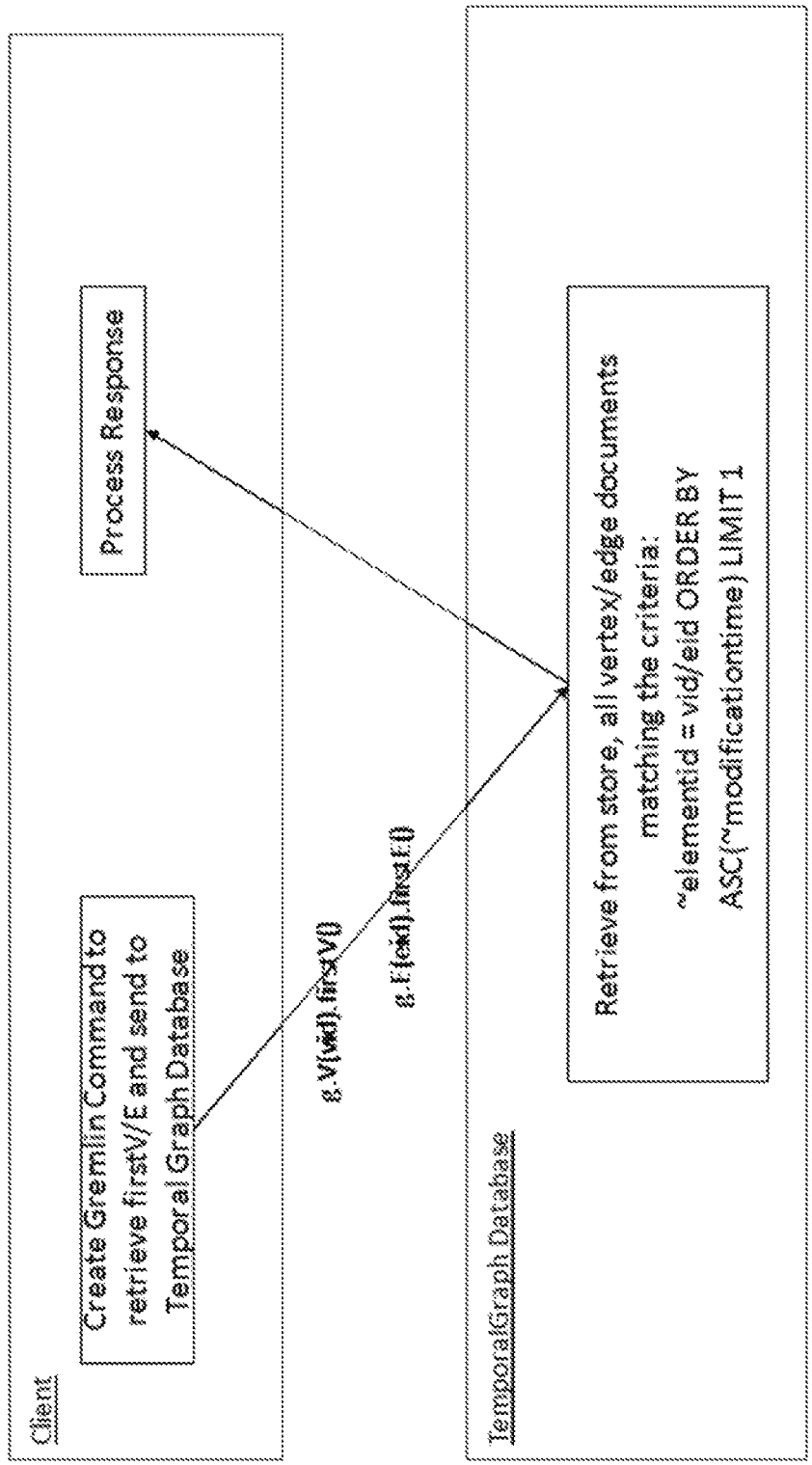

FIG. 6B illustrates example steps for retrieving the first version of a graph element. In FIG. 6B, the client sends a "first" command to the server. The command specifies a source vertex with a vertex identifier of "vid." The server processes the command and retrieves all vertices that have vertex identifier "vid," sorts them in ascending order by modification time value, and selects the first vertex in the sorted list.

Figure 6C:
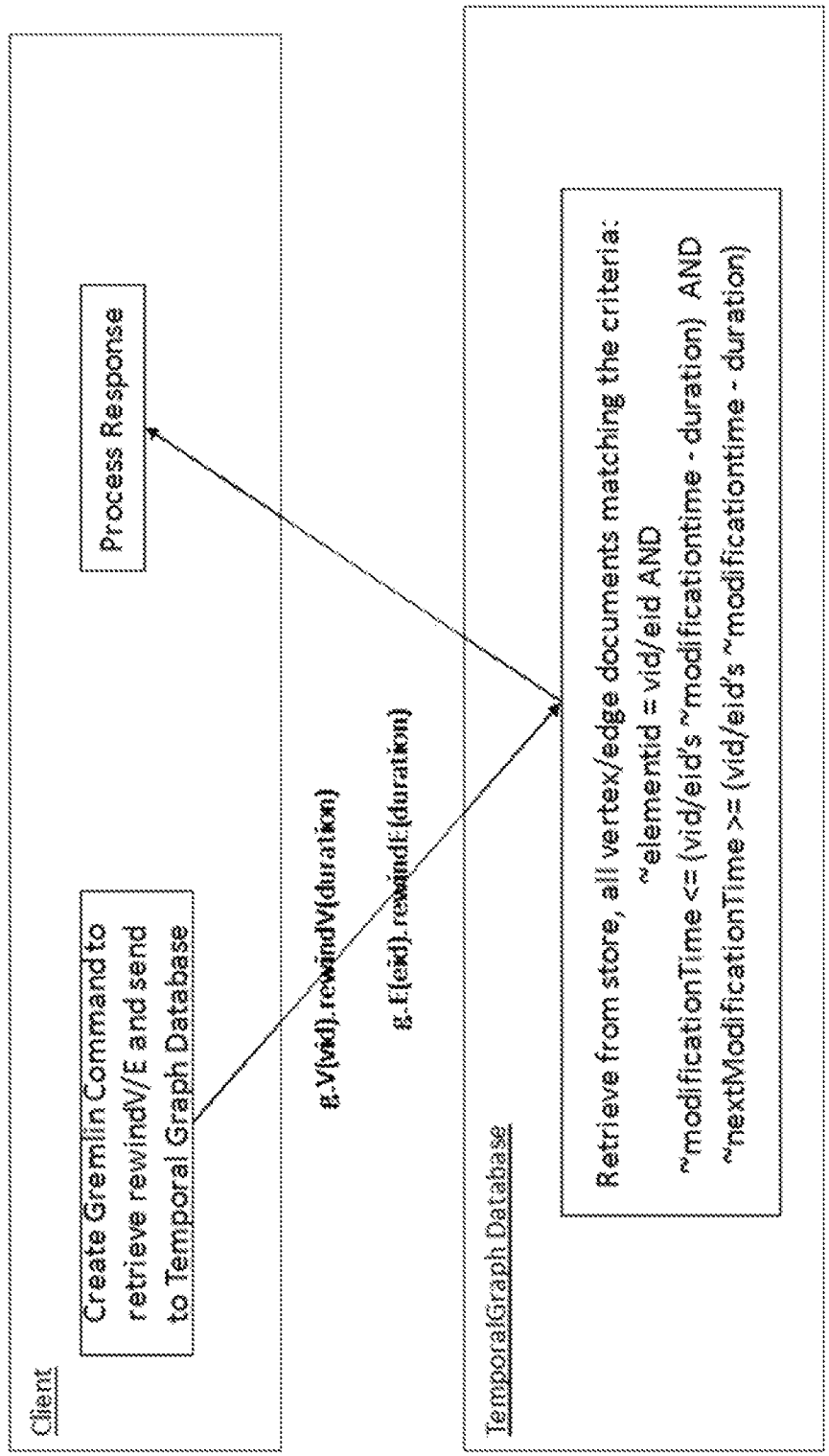

FIG. 6C illustrates example steps for rewinding a graph element. In FIG. 6C, the client sends a "rewind" command to the server. The command specifies a source vertex with a vertex identifier of "vid," and a rewind duration value. The rewind duration value is the amount of time units by which the graph element should be rewound. The server processes the command and retrieves all vertices that have vertex identifier "vid," whose modification time value is less than or equal to the modification time value of the source vertex minus the rewind duration value, and whose subsequent modification time value is greater than or equal to the modification time value of the source vertex minus the rewind duration value.

Figure 6D:
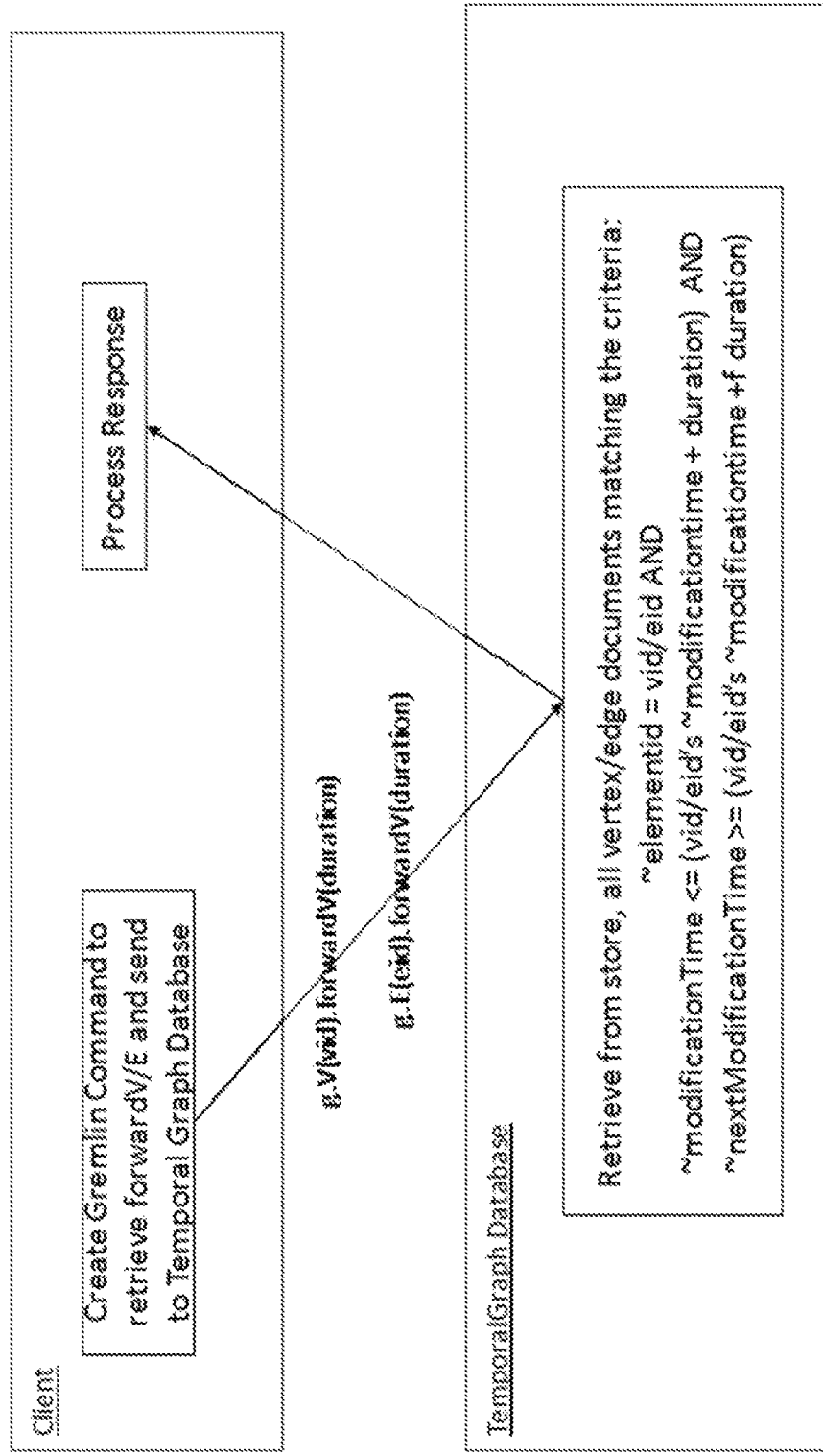

FIG. 6D illustrates example steps for forwarding a graph element. In FIG. 6D, the client sends a "forward" command to the server. The command specifies a source vertex with a vertex identifier of "vid," and a forward duration value. The forward duration value is the amount of time units by which the graph element should be forwarded. The server processes the command and retrieves all vertices that have vertex identifier "vid," whose modification time value is less than or equal to the modification time value of the source vertex plus the forward duration value, and whose subsequent modification time value is greater than or equal to the modification time value of the source vertex plus the forward duration value.

Although examples are described above with reference to vertices, temporal traversal operations may be used with either vertices or edges.

5.2 Snapshot Retrieval and Traversal

A graph snapshot describes the function or state of the temporal graph at a given point in time. In an embodiment, a graph snapshot comprises a snapshot vertex. The snapshot vertex has outgoing edges to all vertices of the temporal graph that are captured by the graph snapshot. The snapshot vertex may be traversed to retrieve the vertices and edges captured by the graph snapshot. In an embodiment, the snapshot vertex is a virtual vertex and the edges connecting the snapshot vertex to the graph vertices are virtual edges. As referred to herein, a virtual graph element is a graph element that is not stored in temporal graph data. The virtual graph element may be temporarily stored in memory. Additionally or alternatively, a virtual graph element may be a data object from which other temporal graph operations may be performed.

An example command for retrieving the snapshot vertex for a given point of time may be:

g.S(timestamp)

The above command may not perform any retrieval from a storage device. In an embodiment, when the command is executed, a virtual vertex object reference that represents the snapshot at the specified time is returned.

As discussed above, a snapshot may comprise a snapshot vertex with outgoing edges to each vertex in the snapshot. Similarly, all the vertices in a snapshot have a virtual outgoing edge to the snapshot vertex which is a virtual vertex. Thus, given a vertex, a snapshot vertex for that vertex could be retrieved. The snapshot vertex may be for a snapshot corresponding to the modification time of the vertex.

A benefit of this technique is that it does not require any special commands for creating a snapshot, such as "commit" or "push," and does not require storing any additional data. Snapshots may be retrieved from any point in time, even at a millisecond granularity, without having to retrieve data from storage. Additionally, retrieval of a snapshot at any point in time may be performed with the same time complexity, O(1). Thus, the techniques described herein allow efficient retrieval of temporal graph snapshots.

In an embodiment, once the snapshot vertex is retrieved, edges and vertices that belong to the snapshot may be acquired. An example command for retrieving all vertices of a particular snapshot at a given timestamp may be:

g.S(timestamp).outV( )

In the above example, a snapshot vertex is retrieved at the given timestamp. From the snapshot vertex, all outgoing vertices are retrieved. As discussed above, the snapshot vertex has an outgoing edge to all vertices in the snapshot.

Additionally or alternatively, all vertices at a given time may be retrieved without first retrieving a snapshot vertex. A command may be used to retrieve all vertices in a temporal graph that correspond to a particular timestamp. An example command for retrieving all vertices at a given timestamp may be:

g.V(timestamp)

Similarly, all edges at a given time may be retrieved from a snapshot vertex. All outgoing vertices from the snapshot vertex are retrieved as described above, and then all outgoing (or incoming) edges from the vertices may be retrieved. Additionally or alternatively, all edges at a given time may be retrieved without first retrieving a snapshot vertex. A command may be used to retrieve all edges in a temporal graph that correspond to a particular timestamp. Example commands for retrieving all edges at a given time may be:

g.S(timestamp).outV( ).outE( )

g.E(timestamp)

In some embodiments, given any vertex at a particular time, the corresponding snapshot vertex can be obtained. Example commands for retrieving a snapshot vertex from a graph vertex may be:

g.S(v.value('~timestamp'));

In an embodiment, "~timestamp" is a command that retrieves the timestamp of the snapshot to which a graph element belongs. Additionally, similar commands may be used to retrieve the time a graph element was first created or the time at which a graph element was deleted, if it has been deleted. In other embodiments, a particular timestamp value is specified.

Additionally or alternatively, the edge from a snapshot vertex to a vertex may be traversed to retrieve the snapshot vertex. An example command for traversing from a vertex to a snapshot vertex may be:

v.out('snapshot');

In the command described above, "snapshot" is a parameter value used to retrieve edge(s) of the vertex with the specified edge label, i.e. to retrieve a snapshot edge.

In an embodiment, once a snapshot vertex is retrieved, the snapshot may be rewound or forwarded, similar to the rewinding and forwarding process described above for other vertices. Rewinding or forwarding by a particular duration retrieves a snapshot vertex corresponding to the rewound or forwarded time. While rewinding, the duration time units is subtracted from the input timestamp and a snapshot vertex is obtained for that time. Similarly, for forwarding, the duration time units is added to the input timestamp. Example commands for rewinding and forwarding a snapshot, and retrieving all vertices at the rewound or forwarded snapshot may be:

g.S(timestamp).rewind(Duration).outV( )
g.S(timestamp).forward(Duration).outV( )

Figure 7:
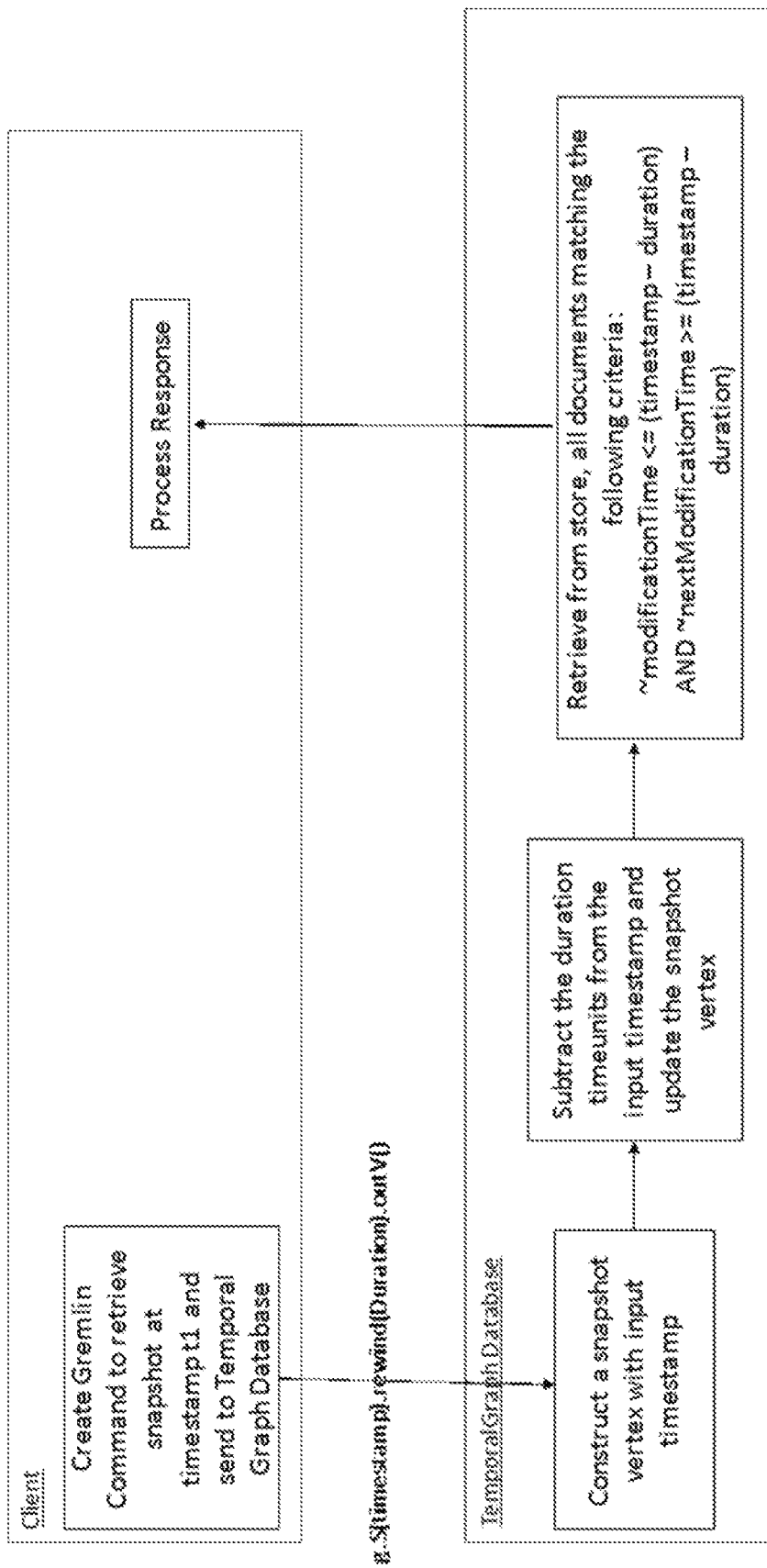
FIG. 7 is a flowchart of an example process for snapshot retrieval, according to various embodiments.

FIG. 7 illustrates example steps for snapshot retrieval of a temporal graph. In the illustrated example, a client, such as client computing device 104, sends a request to a server, such as server computer 110. The server computer processes the request, retrieves temporal graph data for graph elements that satisfy the request, and sends the temporal graph data to the client. In the illustrated embodiment, the server computer translates the request into database commands to retrieve temporal graph data satisfying the request from a database.

In FIG. 7, the client sends a command to rewind a snapshot and retrieve all vertices. The command specifies a timestamp value and a rewind duration value. The timestamp value is the time at which the snapshot should be retrieved. The rewind duration value is the amount of time units by which the snapshot should be rewound. The server processes the command and creates a snapshot vertex associated with the specified timestamp, subtracts the rewind duration value from the timestamp value to generate an updated timestamp, and generates an updated snapshot vertex associated with the updated timestamp. The server retrieves all vertices whose modification time is less than or equal to the updated timestamp (the specified timestamp minus the rewind duration value), and whose subsequent modification time is greater than or equal to the updated timestamp.

5.3 Historical Data Retrieval

Temporal graph structure and graph element properties change over time. Historical data retrieval comprises retrieving graph element history from between any two points in time. Retrieving historical data for graph elements includes retrieving graph elements from a period of time that satisfy particular criteria or conditions. For example, graph elements that were created, modified, deleted, and/or existed during a particular time range may be retrieved. As another example, graph elements with particular property values during a particular time range may be retrieved. Additionally, for a given vertex, all of the inbound and/or outbound edges that were created, deleted, modified, and/or existed within a specified time period may be retrieved.

Figure 8:
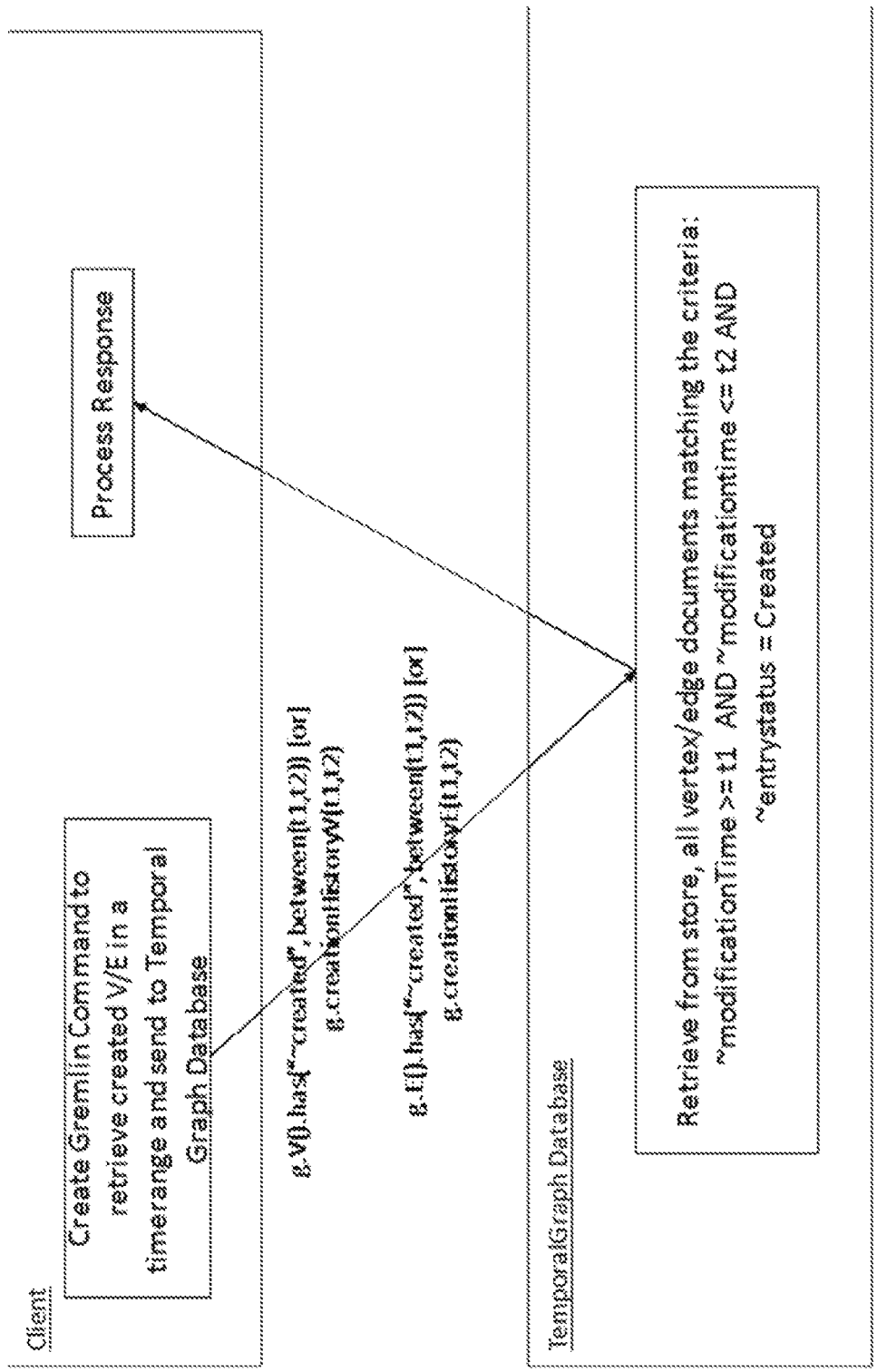
FIG. 8 is a flowchart of an example process for historical data retrieval, according to various embodiments.

FIG. 8 illustrates example steps for element history retrieval for graph elements. In the illustrated examples, a client, such as client computing device 104, sends a request to a server, such as server computer 110. The server computer processes the request, retrieves temporal graph data for graph elements that satisfy the request, and sends the temporal graph data to the client. In the illustrated embodiment, the server computer translates the request into database commands to retrieve temporal graph data satisfying the request.

In FIG. 8, vertices that were created during a particular time interval are requested. The client sends a "has" command to the server. The command includes the criteria "created," and "between (t1, t2)." Similarly, conditions such as "modified," "deleted," or "existed," may be specified to retrieve graph elements that were modified, deleted, or existed.

FIG. 8 additionally illustrates an alternate command, "creationHistory," for retrieving graph elements that were created between time t1 and time t2. Similar commands may be used to retrieve graph elements that were modified, deleted, or existed.

The server processes the command and retrieves all vertices whose modification time value is greater than or equal to t1 and less than or equal to t2, and whose status identifier indicates that the vertex was created.

6.0 Network Analysis Using Temporal Graphs

Using a temporal graph, time-series visualization of any domain model that can be modelled as a graph may be performed. For example, temporal graphs may be used for: graph based traversal, search, and analysis; authorization and access control; social networking information storage and retrieval; network impact analysis; time-based route calculations; real-time recommendation engines; logistics; fraud detection; and finance.

More specifically, in the field of computer networking, temporal graphs may be used for network analytics, such as network assurance, network monitoring, link cost analysis, and network data flow analytics. Network telemetry information can be aggregated and converted into temporal graph data. Based on the temporal graph, specific usage information can be retrieved based on arbitrary time intervals.

As an example, user, application, location and network data may be stored in a temporal graph. The temporal graph may be used to identify network analytics information such as: all applications a user used in the last 15 minutes; all links a user browsed in the last week; the top user in a particular building this week; what devices or endpoints a user is using; applications that a particular user is using, or; the top applications used by a particular user, sorted in descending order.

As another example, the traffic information on a network link can be aggregated and stored in a temporal graph. The temporal graph may be used to identify traffic patterns along spatial and temporal intervals.

Figure 9:
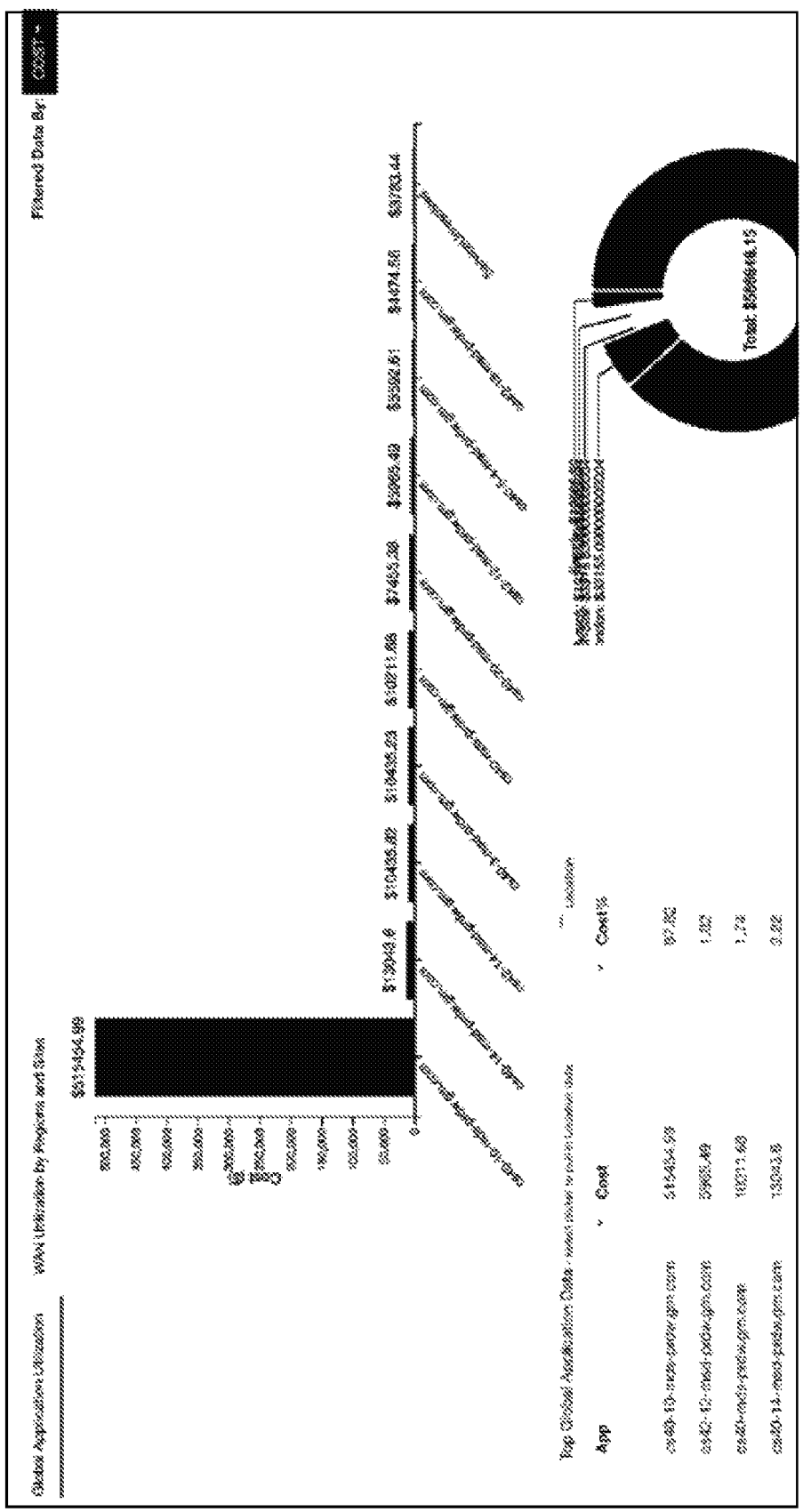
FIG. 9 is an example graphical user interface displaying network analysis information, according to various embodiments.

As described below with reference to FIGS. 10-13, different temporal graph operations are used to retrieve temporal graph data used for network analysis. In an embodiment, commands are used as described above to request or retrieve temporal graph data. Network analytics information may comprise the retrieved temporal graph data. Additionally or alternatively, temporal graph data may be further processed, filtered, or formatted to generate network analytics information. For example, if vertex metadata includes a plurality of properties corresponding to network devices, one or more desired properties of the plurality may be retrieved in response to a request for network analytics information. Additionally or alternatively, generating network analytics information comprises processing and display temporal graph data in graphical and/or text form. FIG. 9 illustrates an example graphical user interface displaying network analytics information.

Figure 10:
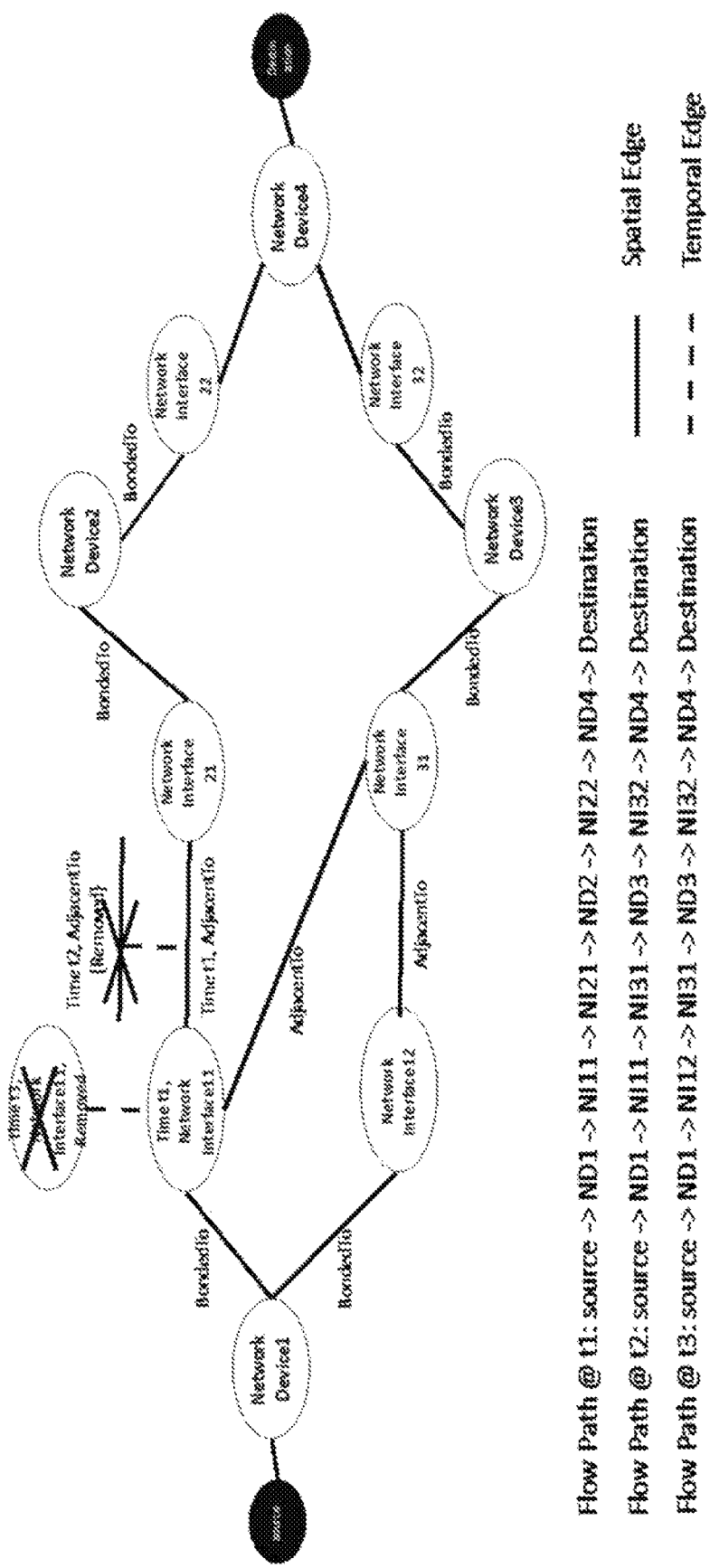
FIG. 10 is an example temporal graph describing network telemetry information, according to various embodiments.

FIG. 10 illustrates graph representing an example computer network where a source is sending data to a destination. It depicts the different paths taken by the same flow at different times. At time t2, there is a link failure between two devices resulting in the path change. At time t3, there is an interface failure/removal resulting in another path change for the same flow between the source and the destination. In the illustrated example, the paths between source and destination at different points in time may be determined by obtaining graph snapshots S(t1), S(t2), and S(t3).

Figure 11:
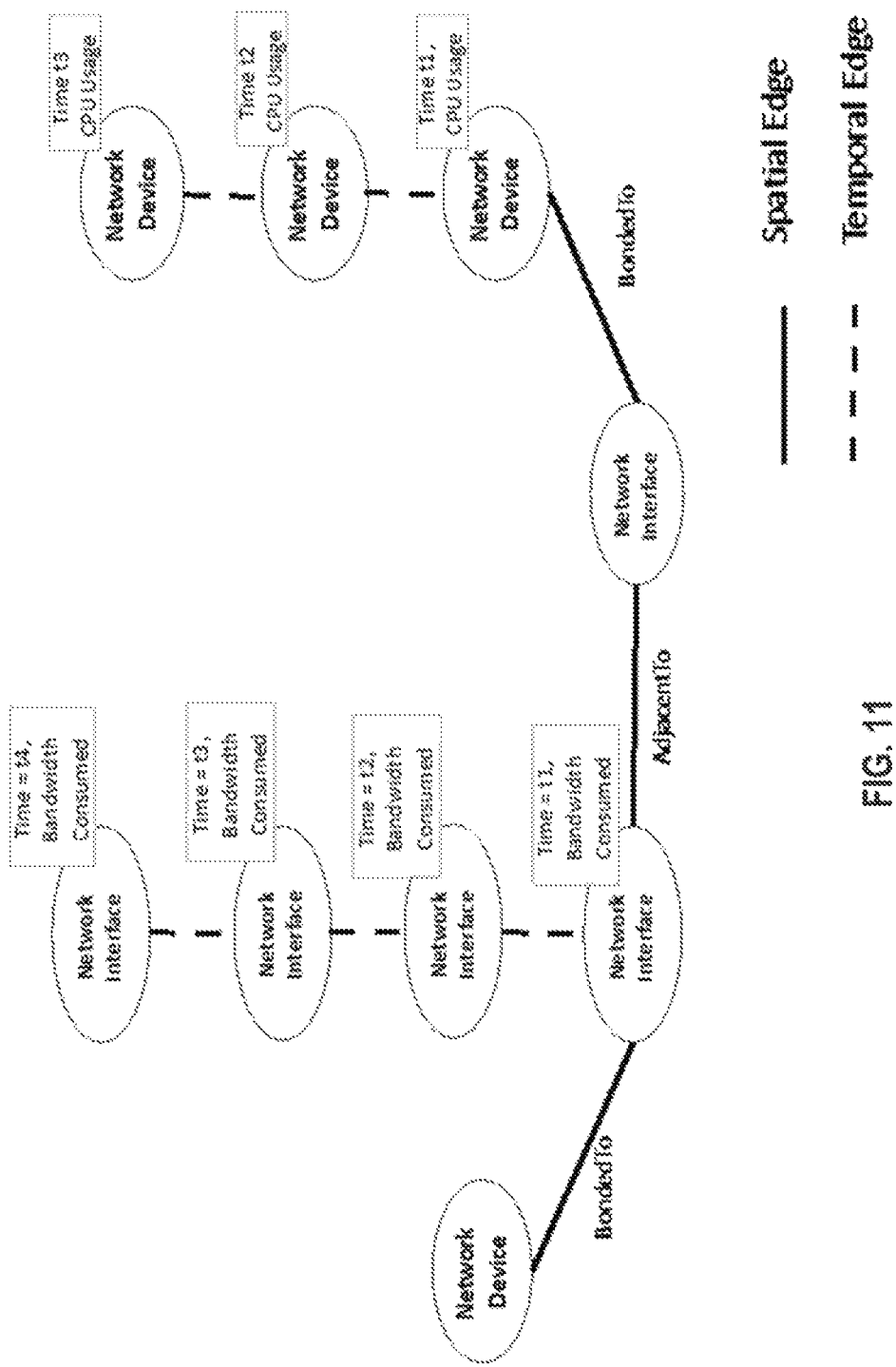
FIG. 11 is an example temporal graph describing network telemetry information, according to various embodiments.

FIG. 11 illustrates an example graph tracking changes in bandwidth consumed on a network interface and CPU usage by a network device. Temporal graph traversal may be used to move along the timeline to get the previous and/or next modifications to the network, to determine changes over time.

For example, temporal graph traversal may be used to identify network interfaces whose bandwidth exceeded a specific threshold three consecutive times. For each network interface, the corresponding vertex at a particular timestamp is acquired. The temporal edge is traversed to reach the next corresponding vertex, and the value of the bandwidth usage property is compared with the threshold value. The exit condition is reached after temporally traversing to the next edge three times.

As another example, temporal graph traversal may be used to identify network devices whose CPU usage is greater than a given threshold in the last hour. For each network device, the corresponding vertex at a particular timestamp is acquired. The temporal edge is traversed to reach the corresponding previous vertex, and the value of the CPU usage property is compared with the threshold value. The exit condition is to stop traversing if the timestamp of the previous version is greater than one hour from the timestamp of the start vertex.

Figure 12:
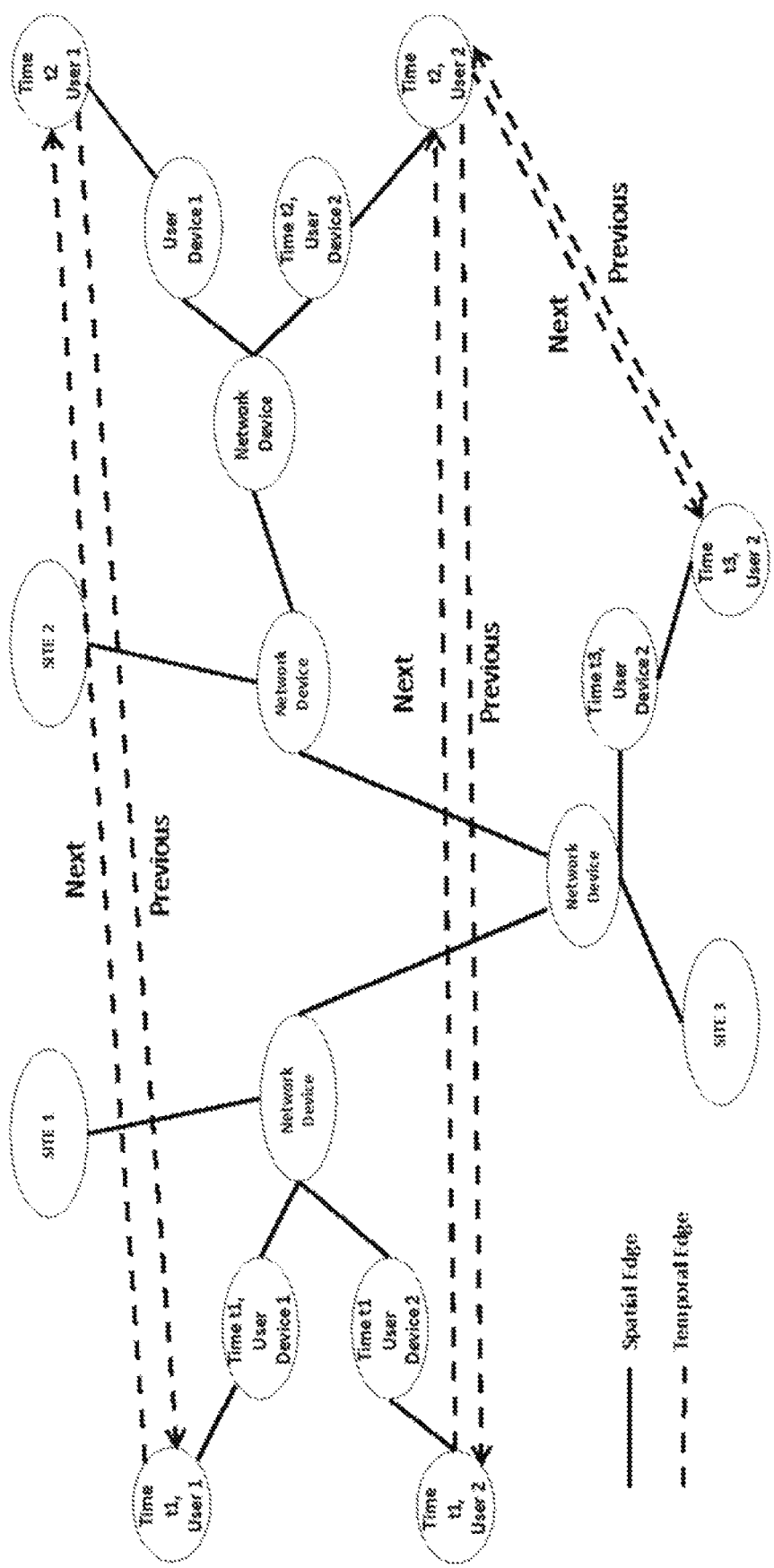
FIG. 12 is an example temporal graph describing network telemetry information, according to various embodiments.

FIG. 12 illustrates a graph depicting movement of users connected to a computer network. At time t1, user 1 is located at site 1, and at time t2 is located at site 2. Similarly, user 2 is at site 1 at time t1, site 2 at time t2, and site 3 at time t3. Temporal graph traversal may be used to track the movements of each user. For example, the previous and next operations may be used to identify the previous and subsequent locations of a user. Similarly, the first and last operations may be used to identify the first and the final locations of the user.

Figure 13:
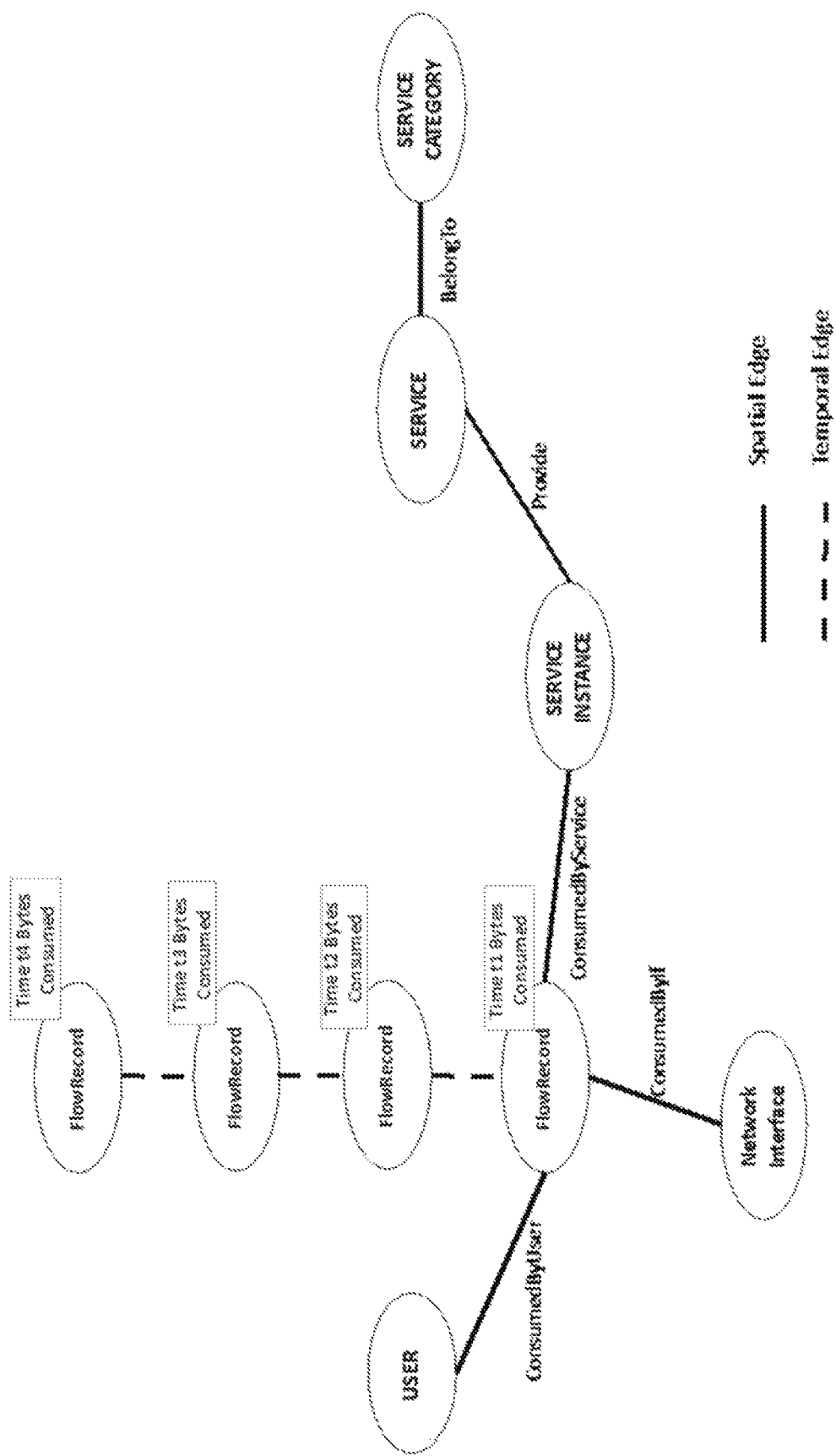
FIG. 13 is an example temporal graph describing network telemetry information, according to various embodiments.

FIG. 13 illustrates a graph depicting periodic FlowRecord updates that track bandwidth consumed during the corresponding duration. In order to analyze historical bandwidth consumption by the computer network, historical data retrieval may be used to retrieve all modified FlowRecord references during a particular time interval. The value of the bytes consumed may be aggregated to indicate total bandwidth consumption for the particular time interval.

7.0 Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 14:
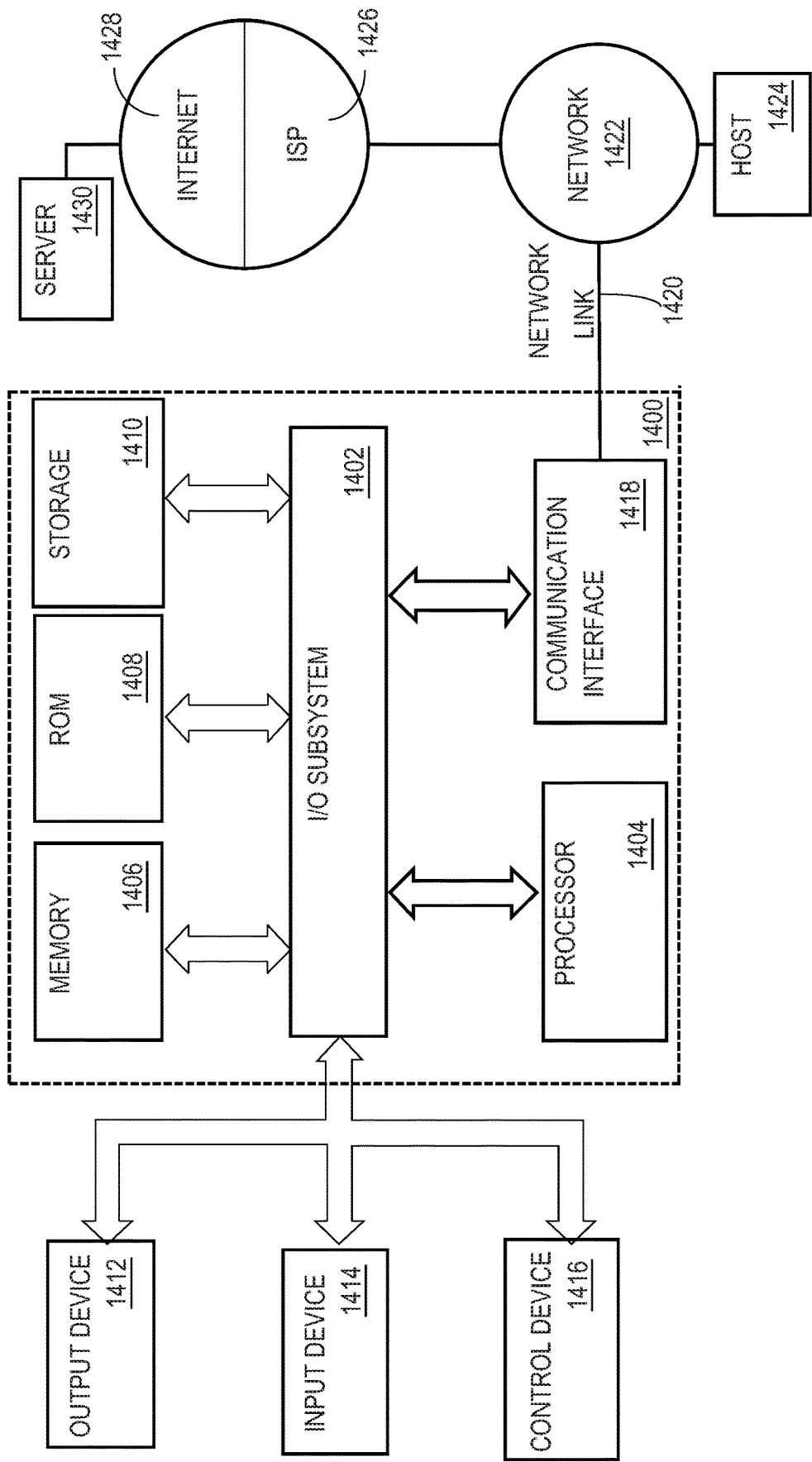
FIG. 14 is a block diagram that illustrates a computer system upon which an embodiment of the invention may be implemented.

FIG. 14 is a block diagram that illustrates an example computer system with which an embodiment may be implemented. In the example of FIG. 14, a computer system 1400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1400 includes an input/output (I/O) subsystem 1402 which may include a bus and/or other communication mechanism(s) for communicating information and/or instructions between the components of the computer system 1400 over electronic signal paths. The I/O subsystem 1402 may include an I/O controller, a memory controller and at least one I/O port. The electronic signal paths are represented schematically in the drawings, for example as lines, unidirectional arrows, or bidirectional arrows.

At least one hardware processor 1404 is coupled to I/O subsystem 1402 for processing information and instructions. Hardware processor 1404 may include, for example, a general-purpose microprocessor or microcontroller and/or a special-purpose microprocessor such as an embedded system or a graphics processing unit (GPU) or a digital signal processor or ARM processor. Processor 1404 may comprise an integrated arithmetic logic unit (ALU) or may be coupled to a separate ALU.

Computer system 1400 includes one or more units of memory 1406, such as a main memory, which is coupled to I/O subsystem 1402 for electronically digitally storing data and instructions to be executed by processor 1404. Memory 1406 may include volatile memory such as various forms of random-access memory (RAM) or other dynamic storage device. Memory 1406 also may be used for storing temporary variables or other intermediate information during execution of instructions to be executed by processor 1404. Such instructions, when stored in non-transitory computer-readable storage media accessible to processor 1404, can render computer system 1400 into a special-purpose machine that is customized to perform the operations specified in the instructions.

Computer system 1400 further includes non-volatile memory such as read only memory (ROM) 1408 or other static storage device coupled to I/O subsystem 1402 for storing information and instructions for processor 1404. The ROM 1408 may include various forms of programmable ROM (PROM) such as erasable PROM (EPROM) or electrically erasable PROM (EEPROM). A unit of persistent storage 1410 may include various forms of non-volatile RAM (NVRAM), such as FLASH memory, or solid-state storage, magnetic disk or optical disk such as CD-ROM or DVD-ROM, and may be coupled to I/O subsystem 1402 for storing information and instructions. Storage 1410 is an example of a non-transitory computer-readable medium that may be used to store instructions and data which when executed by the processor 1404 cause performing computer-implemented methods to execute the techniques herein.

The instructions in memory 1406, ROM 1408 or storage 1410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1400 may be coupled via I/O subsystem 1402 to at least one output device 1412. In one embodiment, output device 1412 is a digital computer display. Examples of a display that may be used in various embodiments include a touch screen display or a light-emitting diode (LED) display or a liquid crystal display (LCD) or an e-paper display. Computer system 1400 may include other type(s) of output devices 1412, alternatively or in addition to a display device. Examples of other output devices 1412 include printers, ticket printers, plotters, projectors, sound cards or video cards, speakers, buzzers or piezoelectric devices or other audible devices, lamps or LED or LCD indicators, haptic devices, actuators or servos.

At least one input device 1414 is coupled to I/O subsystem 1402 for communicating signals, data, command selections or gestures to processor 1404. Examples of input devices 1414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1416, which may perform cursor control or other automated control functions such as navigation in a graphical interface on a display screen, alternatively or in addition to input functions. Control device 1416 may be a touchpad, a mouse, a trackball, or cursor direction keys for communicating direction information and command selections to processor 1404 and for controlling cursor movement on display 1412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1414 may include a combination of multiple different input devices, such as a video camera and a depth sensor.

In another embodiment, computer system 1400 may comprise an internet of things (IoT) device in which one or more of the output device 1412, input device 1414, and control device 1416 are omitted. Or, in such an embodiment, the input device 1414 may comprise one or more cameras, motion detectors, thermometers, microphones, seismic detectors, other sensors or detectors, measurement devices or encoders and the output device 1412 may comprise a special-purpose display such as a single-line LED or LCD display, one or more indicators, a display panel, a meter, a valve, a solenoid, an actuator or a servo.

When computer system 1400 is a mobile computing device, input device 1414 may comprise a global positioning system (GPS) receiver coupled to a GPS module that is capable of triangulating to a plurality of GPS satellites, determining and generating geo-location or position data such as latitude-longitude values for a geophysical location of the computer system 1400. Output device 1412 may include hardware, software, firmware and interfaces for generating position reporting packets, notifications, pulse or heartbeat signals, or other recurring data transmissions that specify a position of the computer system 1400, alone or in combination with other application-specific data, directed toward host 1424 or server 1430.

Computer system 1400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1400 in response to processor 1404 executing at least one sequence of at least one instruction contained in main memory 1406. Such instructions may be read into main memory 1406 from another storage medium, such as storage 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1410. Volatile media includes dynamic memory, such as memory 1406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1402. Transmission media can also take the form of acoustic or light waves, such as those generated during radio-wave and infra-red data communications.

Various forms of media may be involved in carrying at least one sequence of at least one instruction to processor 1404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1400 can receive the data on the communication link and convert the data to a format that can be read by computer system 1400. For instance, a receiver such as a radio frequency antenna or an infrared detector can receive the data carried in a wireless or optical signal and appropriate circuitry can provide the data to I/O subsystem 1402 such as place the data on a bus. I/O subsystem 1402 carries the data to memory 1406, from which processor 1404 retrieves and executes the instructions. The instructions received by memory 1406 may optionally be stored on storage 1410 either before or after execution by processor 1404.

Computer system 1400 also includes a communication interface 1418 coupled to bus 1402. Communication interface 1418 provides a two-way data communication coupling to network link(s) 1420 that are directly or indirectly connected to at least one communication networks, such as a network 1422 or a public or private cloud on the Internet. For example, communication interface 1418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1422 broadly represents a local area network (LAN), wide-area network (WAN), campus network, internetwork or any combination thereof. Communication interface 1418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1418 sends and receives electrical, electromagnetic or optical signals over signal paths that carry digital data streams representing various types of information.

Network link 1420 typically provides electrical, electromagnetic, or optical data communication directly or through at least one network to other data devices, using, for example, satellite, cellular, Wi-Fi, or BLUETOOTH technology. For example, network link 1420 may provide a connection through a network 1422 to a host computer 1424.

Furthermore, network link 1420 may provide a connection through network 1422 or to other computing devices via internetworking devices and/or computers that are operated by an Internet Service Provider (ISP) 1426. ISP 1426 provides data communication services through a world-wide packet data communication network represented as internet 1428. A server computer 1430 may be coupled to internet 1428. Server 1430 broadly represents any computer, data center, virtual machine or virtual computing instance with or without a hypervisor, or computer executing a containerized program system such as DOCKER or KUBERNETES. Server 1430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1400 and server 1430 may form elements of a distributed computing system that includes other computers, a processing cluster, server farm or other organization of computers that cooperate to perform tasks or execute applications or services. Server 1430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1430 may comprise a web application server that hosts a presentation layer, application layer and data storage layer such as a relational database system using structured query language (SQL) or no SQL, an object store, a graph database, a flat file system or other data storage.

Computer system 1400 can send messages and receive data and instructions, including program code, through the network(s), network link 1420 and communication interface 1418. In the Internet example, a server 1430 might transmit a requested code for an application program through Internet 1428, ISP 1426, local network 1422 and communication interface 1418. The received code may be executed by processor 1404 as it is received, and/or stored in storage 1410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1404. While each processor 1404 or core of the processor executes a single task at a time, computer system 1400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:
   receiving telemetry information for a computer network, the telemetry information comprising network device state information for internetworking devices in the computer network and network traffic flow information for data packet flows through the computer network;
   transforming the telemetry information into a temporal graph that is digitally stored in computer memory, wherein the temporal graph comprises a plurality of graph elements include a plurality of vertices and a plurality of edges, each of the vertices representing an internetworking device in the computer network, each of the edges representing one or more portions of a data packet flow through the computer network; and
   digitally storing graph element metadata corresponding to the plurality of graph elements in a structured format, the graph element metadata comprising temporal data for each graph element of the plurality of graph elements, the temporal data comprising a modification time value specifying a modification time that is associated with each graph element, wherein digitally storing the graph element metadata comprises digitally storing temporal links to at least one of the following: a previous version if the previous version exist or a subsequent version if the subsequent version exist of the plurality of graph elements, and wherein the temporal links are traversed to retrieve at least one of the following: the previous version or the subsequent version of a graph element of the plurality of graph elements.

2. The method of claim 1 wherein the graph element metadata comprises vertex metadata corresponding to each vertex of the plurality of vertices and edge metadata corresponding to each edge of the plurality of edges.

3. The method of claim 1 wherein the temporal data for each graph element further comprises a subsequent modification time value specifying a modification time that is associated with the subsequent version of the graph element.

4. The method of claim 3 further comprising:
   in response to receiving a request to modify a particular graph element:
   generating a new graph element that is a second version of the particular graph element, wherein the new graph element is associated with a particular modification time, and storing graph element metadata corresponding to the new graph element, the new graph element metadata including a modification to the particular graph element; and
   updating the temporal data of the particular graph element to include a subsequent modification time value that specifies the particular modification time.

5. The method of claim 3 further comprising:
   in response to receiving a request to delete a particular graph element:
   generating a new graph element that is a second version of the particular graph element, wherein the new graph element is associated with a particular modification time, and storing graph element metadata corresponding to the new graph element, the new graph element metadata including metadata indicating that the new graph element is a deleted graph element; and
   updating the temporal data of the particular graph element to include a subsequent modification time value that specifies the particular modification time.

6. The method of claim 1 further comprising, in response to receiving a request for a snapshot of the temporal graph, generating a snapshot vertex, wherein the snapshot vertex is connected to a first set of one or more vertices, of the plurality of vertices, that are associated with the request for the snapshot.

7. The method of claim 6 further comprising:
   in response to receiving a request to temporally traverse the snapshot of the temporal graph, generating an updated snapshot vertex, wherein the updated snapshot vertex is connected to a second set of one or more vertices, of the plurality of vertices, that are associated with the temporal traversal of the snapshot.

8. The method of claim 1 further comprising:
   in response to receiving a request for temporal graph data, wherein the request includes one or more request criteria, identifying a set of one or more graph elements that satisfy the one or more request criteria;
   retrieving graph element metadata corresponding to the set of one or more graph elements.

9. The method of claim 8 wherein identifying the set of one or more graph elements is based at least in part on the temporal data associated with each graph element of the set of one or more graph elements.

10. The method of claim 9 wherein the request includes temporal traversal of one or more particular graph elements, the method further comprising modifying the one or more request criteria to include the temporal traversal.

11. A non-transitory computer medium storing instructions which when executed perform a method comprising:
    receiving telemetry information for a computer network, the telemetry information comprising network device state information for internetworking devices in the computer network and network traffic flow information for data packet flows through the computer network;
    transforming the telemetry information into a temporal graph that is digitally stored in computer memory, wherein the temporal graph comprises a plurality of graph elements comprising a plurality of vertices and a plurality of edges, each of the plurality of vertices representing an internetworking device in the computer network, each of the plurality of edges representing one or more portions of a data packet flow through the computer network; and
    digitally storing graph element metadata corresponding to the plurality of graph elements in a structured format, the graph element metadata comprising temporal data for each graph element of the plurality of graph elements, the temporal data comprising a modification time value specifying a modification time that is associated with each graph element, wherein digitally storing the graph element metadata comprises digitally storing temporal links to at least one of the following: a previous version if the previous version exist or a subsequent version if the subsequent version exist of the plurality of graph elements, and wherein the temporal links are traversed to retrieve at least one of the following: the previous version or the subsequent version of a graph element of the plurality of graph elements.

12. The non-transitory computer readable medium of claim 11 wherein the graph element metadata comprises vertex metadata corresponding to each vertex of the plurality of vertices and edge metadata corresponding to each edge of the plurality of edges.

13. The non-transitory computer readable medium of claim 11 wherein the temporal data for each graph element further comprises a subsequent modification time value specifying a modification time that is associated with the subsequent version of the graph element.

14. The non-transitory computer readable medium of claim 13, further comprising:
in response to receiving a request to modify a particular graph element:
generating a new graph element that is a second version of the particular graph element, wherein the new graph element is associated with a particular modification time, and storing graph element metadata corresponding to the new graph element, the new graph element metadata including a modification to the particular graph element;
updating the temporal data of the particular graph element to include a subsequent modification time value that specifies the particular modification time.

15. The non-transitory computer readable medium of claim 13, further comprising:
in response to receiving a request to delete a particular graph element:
generating a new graph element that is a second version of the particular graph element, wherein the new graph element is associated with a particular modification time, and storing graph element metadata corresponding to the new graph element, the new graph element metadata including metadata indicating that the new graph element is a deleted graph element; and
updating the temporal data of the particular graph element to include a subsequent modification time value that specifies the particular modification time.

16. The non-transitory computer readable medium of claim 11, further comprising:
generating, in response to receiving a request for a snapshot of the temporal graph, a snapshot vertex, wherein the snapshot vertex is connected to a first set of one or more vertices, of the plurality of vertices, that are associated with the request for the snapshot.

17. The non-transitory computer readable medium of claim 16, further comprising:
generating, in response to receiving a request to temporally traverse the snapshot of the temporal graph, an updated snapshot vertex, wherein the updated snapshot vertex is connected to a second set of one or more vertices, of the plurality of vertices, that are associated with the temporal traversal of the snapshot.

18. The non-transitory computer readable medium of claim 11, further comprising:
in response to receiving a request for temporal graph data, wherein the request includes one or more request criteria, identifying a set of one or more graph elements that satisfy the one or more request criteria; and
retrieving graph element metadata corresponding to the set of one or more graph elements.

19. The non-transitory computer readable medium of claim 18 wherein identifying the set of one or more graph elements is based at least in part on the temporal data associated with each graph element of the set of one or more graph elements.

20. The non-transitory computer readable medium of claim 19, further comprising modifying the one or more request criteria to include the temporal traversal, wherein the request includes temporal traversal of one or more particular graph elements.

* * * * *